US012713395B2

(12) United States Patent
Xu et al.

(10) Patent No.: US 12,713,395 B2
(45) Date of Patent: Aug. 18, 2026

(54) COMMUNICATION METHOD AND APPARATUS

(71) Applicant: HUAWEI TECHNOLOGIES CO., LTD., Shenzhen (CN)

(72) Inventors: Bin Xu, Beijing (CN); Bingzhao Li, Beijing (CN); Lei Chen, Beijing (CN); Haifeng Yu, Beijing (CN); Hong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 531 days.

(21) Appl. No.: 17/842,196

(22) Filed: Jun. 16, 2022

(65) Prior Publication Data

US 2022/0322285 A1 Oct. 6, 2022

Related U.S. Application Data

(63) Continuation of application No. PCT/CN2019/126093, filed on Dec. 17, 2019.

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC .............................. H04W 68/02; H04W 76/28
See application file for complete search history.

(56) References Cited

U.S. PATENT DOCUMENTS 11,071,086 B2 * 7/2021 Park ...................... H04W 76/28
2004/0142706 A1 7/2004 Kim et al.
2004/0180675 A1 * 9/2004 Choi ..................... H04L 65/611 455/458
2006/0046762 A1 * 3/2006 Yoon ..................... H04W 68/02 455/519
2010/0279715 A1 * 11/2010 Alanara ................ H04W 68/02 455/458
2015/0304821 A1 * 10/2015 Liu ...................... H04W 16/14 370/312

(Continued)

FOREIGN PATENT DOCUMENTS

CN 1496137 A 5/2004
CN 1505411 A 6/2004
CN 1518243 A 8/2004

(Continued)

OTHER PUBLICATIONS

Extended European Search Report issued in corresponding European Application No. 19956606.8, dated Nov. 8, 2022, pp. 1-11.

(Continued)

*Primary Examiner* — Umair Ahsan
(74) *Attorney, Agent, or Firm* — HAUPTMAN HAM, LLP

(57) ABSTRACT

A communication method and apparatus, wherein a first identity of a first service is obtained, and a first paging occasion is determined based on the first identity, where the first paging occasion is used by the terminal device to receive a first message, and the first message is used to page the terminal device. The first paging occasion is determined based on the first identity, so that the network device pages, on the first paging occasion, a plurality of terminal devices that is to receive data of the first service.

16 Claims, 11 Drawing Sheets

(56) References Cited

U.S. PATENT DOCUMENTS

2017/0064671 A1* 3/2017 Rashid ................ H04W 68/025
2019/0364462 A1 11/2019 Kim et al.

FOREIGN PATENT DOCUMENTS

CN 1567773 A 1/2005
EP 1377099 A1 1/2004
EP 1420551 A2 5/2004
KR 20120025392 A * 3/2012 ........ H04W 74/0875

OTHER PUBLICATIONS

International Search Report issued in corresponding International Search Report PCT/CN2019/126093, dated Aug. 28, 2020, pp. 1-9.

* cited by examiner

COMMUNICATION METHOD AND APPARATUS

CROSS-REFERENCE TO RELATED APPLICATIONS

This application is a continuation of International Application No. PCT/CN2019/126093, filed on Dec. 17, 2019, the disclosure of which is hereby incorporated by reference in its entirety.

BACKGROUND

In a wireless communication system, a network device sends a paging message to a terminal in response to a downlink service arriving. There are two types of paging messages sent by the network device: an SMS message-type paging message and a paging message for connection establishment. The SMS message-type paging message is, for example, a system information update message or an earthquake and tsunami warning system (earthquake and tsunami warning system, ETWS) message. The SMS message-type message is received by a terminal device in an idle state, an inactive state, or a connected state. The paging message for connection establishment is received by a terminal device in an idle state or an inactive state, but does not need to be received by a terminal device in a connected state.

The paging message for connection establishment is used as an example. A possible paging process is as follows: After downlink data arrives at a user plane function (user plane function, UPF) entity, the UPF entity notifies a session management function (session management function, SMF) entity that the data arrives. The SMF entity notifies an access and mobility management function (access and mobility management function, AMF) entity to initiate paging. The AMF entity sends a paging indication to a network device. After receiving the paging indication, the network device pages a specified terminal device.

In some multicast service scenarios, for example, a video conference, television broadcast, video on demand, and online education, a plurality of terminal devices needs to receive same data in these scenarios, that is, data of these services needs to be simultaneously sent to the plurality of terminal devices. Therefore, a network device needs to simultaneously page a large quantity of terminal devices, resulting in high paging overheads.

SUMMARY

In view of this, at least one embodiment provides a communication method and apparatus, to reduce paging overheads.

According to a first aspect, at least one embodiment provides a communication method. The method is applied to a terminal device, or is applied to a chip inside a terminal device. For example, the method is applied to a first terminal device. In this method, the first terminal device obtains a first identity, where the first identity includes at least one of a service identity and a group identity, and then determine a first paging occasion based on the first identity, where the first paging occasion is used by the first terminal device to receive a first message, and the first message is used to page the first terminal device.

In this method, the first paging occasion is determined based on the first identity, so that a network device pages, on the first paging occasion, a plurality of terminal devices that is to receive data of a first service. Compared with a manner in which the network device pages a plurality of terminal devices on paging occasions respectively corresponding to the plurality of terminal devices, using this method effectively reduces paging signaling overheads and further reduce resource overheads, and also effectively reduce processing burden of the network device because the network device does not separately calculate paging occasions corresponding to the plurality of terminal devices.

In at least one embodiment, the first terminal device further obtains a DRX, and determine the first paging occasion based on the first identity and the DRX.

In at least one embodiment, the first terminal device determines a first paging frame based on the first identity, and then determine the first paging occasion in the first paging frame based on the first identity.

In at least one embodiment, the first paging frame satisfies the following formula:

$$(SFN+PF\_offset) \bmod T=(T \text{ div } N)*(S\_ID \bmod N),$$ wherein

SFN is a frame number of the first paging frame, PF_offset is an offset corresponding to the first paging frame, T is the DRX, N is a quantity of paging frames in the DRX, and S_ID is the first identity.

The first paging occasion satisfies the following formula:

$$i\_s=\text{floor}(S\_ID/N) \bmod Ns,$$ wherein i_s is an index value of the first paging occasion, and Ns is a quantity of paging occasions in the first paging frame.

In at least one embodiment, the first message is scrambled by using a first RNTI, where the first RNTI and a second RNTI are different RNTIs. A second message is scrambled by using the second RNTI, where the second message is used to page a second terminal device.

In at least one embodiment, the first message includes service information of the first service (or includes information for indicating service information of the first service); or the first message is used to indicate the first terminal device to receive a third message, where the third message includes service information of the first service (or includes information for indicating service information of the first service), where the service information of the first service includes at least one of a first identity and a service type that are of the first service.

In this method, in response to the first message including the service information of the first service, after receiving the first message, the first terminal device determines that the service information of the first service included in the first message is service information of a service that the first terminal device is interested in, and then receives the third message based on the first message; or in response to the first terminal device determining that the service information of the first service included in the first message is not service information of a service that the first terminal device is interested in, the first terminal device continues monitoring. In addition, the first terminal device learns, based on the service information of the first service, in advance that a reason for paging performed by the network device this time is that the data of the first service is to be received.

In response to the third message including the service information of the first service, the third message no longer includes identities of first terminal devices that is to receive the first service. Because a quantity of bits occupied by the service information of the first service is less than a quantity of bits occupied by the identities of the first terminal devices that is to receive the first service, resource overheads of a paging message are effectively reduced. In addition, the service information of the first service is included in the paging message, so that the first terminal device learns in advance that a purpose of paging this time is to receive the data of the first service. Therefore, the first terminal device performs processing on the first service in a random access process, for example, increase a random access priority or use an individual set of a random access parameter.

In at least one embodiment, the first terminal device obtaining the first identity includes: The first terminal device sends a request message to a core network device, where the request message is used to request the first identity, and receives a response message from the core network device, where the response message includes the first identity.

In at least one embodiment, the first terminal device further determines a first period; and in response to the first message being received, initiate random access after the first period.

In this method, in response to a large quantity of terminal devices is to initiate random access based on the paging message, because the terminal devices initiates random access after the first period, and first periods of different terminal devices is different, this effectively avoids a collision or a conflict caused in response to the large quantity of terminal devices simultaneously initiating random access, effectively improve a random access success rate, and avoid an access latency and resource overheads caused in response to the terminal device re-initiating random access due to a random access failure.

In at least one embodiment, first periods determined by terminal devices that belong to different groups in a plurality of terminal devices are different, where the plurality of terminal devices are terminal devices that receive the first message on the first paging occasion.

According to a second aspect, at least one embodiment provides a communication method. The method is applied to a network device, or is applied to a chip inside a network device. For example, the method is applied to the network device. In this method, the network device obtains a first identity, where the first identity includes at least one of a service identity and a group identity, and then determine a first paging occasion based on the first identity, where the first paging occasion is used by a first terminal device to receive a first message, and the first message is used to page the first terminal device.

In at least one embodiment, the network device further obtains a DRX, and determine the first paging occasion based on the first identity and the DRX.

In at least one embodiment, the network device determines a first paging frame based on the first identity, and then determine the first paging occasion in the first paging frame based on the first identity.

In at least one embodiment, the first paging frame satisfies the following formula:

$$(SFN+PF\_offset) \bmod T=(T \text{ div } N)*(S\_ID \bmod N),$$

wherein

SFN is a frame number of the first paging frame, PF_offset is an offset corresponding to the first paging frame, T is the DRX, N is a quantity of paging frames in the DRX, and S_ID is the first identity.

The first paging occasion satisfies the following formula:

$$i\_s=\text{floor}(S\_ID/N) \bmod Ns,$$ wherein i_s is an index value of the first paging occasion, and Ns is a quantity of paging occasions in the first paging frame.

In at least one embodiment, the first message is scrambled by using a first RNTI, where the first RNTI and a second RNTI are different RNTIs. A second message is scrambled by using the second RNTI, where the second message is used to page a second terminal device.

In at least one embodiment, the first message includes at least one of the first identity and a service type; or the first message is used to indicate the first terminal device to receive a third message, where the third message includes at least one of a first identity and a service type that are of a first service.

In at least one embodiment, the network device receives third indication information from a core network device, where the third indication information includes the first identity, and the third indication information is used to indicate to page at least one terminal device.

According to a third aspect, at least one embodiment provides a communication method. The method is applied to a core network device, or is applied to a chip inside a core network device. In this method, the core network device receives service data of a first service, and sends third indication information to a network device, where the third indication information includes a first identity of the first service, the first identity includes at least one of a service identity and a group identity, and the third indication information is used to indicate to page at least one terminal device.

In this method, the core network device may send the first identity of the first service to the network device, so that the network device determines a first paging occasion based on the first identity.

In at least one embodiment, the third indication information further includes at least one of a DRX and a service type that are of the first service.

The communication methods described in the second aspect and the third aspect correspond to the communication method described in the first aspect, for related beneficial effects of the communication methods described in the second aspect and the third aspect, refer to the first aspect. Details are not described herein again.

According to a fourth aspect, at least one embodiment provides a communication apparatus. The communication apparatus is a terminal device (for example, a first terminal device) or a chip disposed inside a terminal device. The communication apparatus has a function of implementing the first aspect. For example, the communication apparatus includes a corresponding module, unit, or means (means) for performing the steps in the first aspect. The function, the unit, or the means is implemented by software; is implemented by hardware; or is implemented by hardware executing corresponding software.

For example, the communication apparatus includes a communication unit and a processing unit. The communication unit is configured to obtain a first identity, where the first identity includes at least one of a service identity and a group identity. The processing unit is configured to determine a first paging occasion based on the first identity, where the first paging occasion is used by a first terminal device to receive a first message, and the first message is used to page the first terminal device.

In at least one embodiment, the communication unit is further configured to obtain a discontinuous reception cycle DRX; and the processing unit is configured to determine the first paging occasion based on the first identity and the DRX.

In at least one embodiment, the processing unit is configured to: determine a first paging frame based on the first identity, and determine the first paging occasion in the first paging frame based on the first identity.

In at least one embodiment, the first paging frame satisfies the following formula:

$$(SFN+PF\_offset) \bmod T=(T \text{ div } N)*(S\_ID \bmod N),$$ wherein

SFN is a frame number of the first paging frame, PF_offset is an offset corresponding to the first paging frame, T is the DRX, N is a quantity of paging frames in the DRX, and S_ID is the first identity.

The first paging occasion satisfies the following formula:

$$i\_s=\text{floor}(S\_ID/N) \bmod Ns,$$ wherein i_s is an index value of the first paging occasion, and Ns is a quantity of paging occasions in the first paging frame.

In at least one embodiment, the first message is scrambled by using a first radio network temporary identity RNTI, where the first RNTI and a second RNTI are different RNTIs. A second message is scrambled by using the second RNTI, where the second message is used to page a second terminal device.

In at least one embodiment, the first message includes at least one of the first identity and a service type; or the first message is used to indicate the first terminal device to receive a third message, where the third message includes at least one of a first identity and a service type that are of a first service.

In at least one embodiment, the communication unit is configured to: send a request message to a core network device, where the request message is used to request the first identity, and receive a response message from the core network device, where the response message includes the first identity.

In at least one embodiment, the processing unit is further configured to determine a first period; and the communication unit is further configured to: in response to the first message being received, initiate random access after the first period.

In at least one embodiment, first periods determined by terminal devices that belong to different groups in a plurality of terminal devices are different, where the plurality of terminal devices are terminal devices that receive the first message on the first paging occasion.

According to a fifth aspect, at least one embodiment provides a communication apparatus. The communication apparatus is a network device or a chip disposed inside a network device. The communication apparatus has a function of implementing the second aspect. For example, the communication apparatus includes a corresponding module, unit, or means for performing the steps in the second aspect. The function, the unit, or the means is implemented by software; is implemented by hardware; or is implemented by hardware executing corresponding software.

For example, the communication apparatus includes a communication unit and a processing unit. The communication unit is configured to obtain a first identity, where the first identity includes at least one of a service identity and a group identity. The processing unit is configured to determine a first paging occasion based on the first identity, where the first paging occasion is used by a first terminal device to receive a first message, and the first message is used to page the first terminal device.

In at least one embodiment, the communication unit is further configured to obtain a discontinuous reception cycle DRX; and the processing unit is configured to determine the first paging occasion based on the first identity and the DRX.

In at least one embodiment, the processing unit is configured to: determine a first paging frame based on the first identity, and determine the first paging occasion in the first paging frame based on the first identity.

In at least one embodiment, the first paging frame satisfies the following formula:

$$(SFN+PF\_offset) \bmod T=(T \text{ div } N)*(S\_ID \bmod N),$$ wherein

SFN is a frame number of the first paging frame, PF_offset is an offset corresponding to the first paging frame, T is the DRX, N is a quantity of paging frames in the DRX, and S_ID is the first identity.

The first paging occasion satisfies the following formula:

$$i\_s=\text{floor}(S\_ID/N) \bmod Ns,$$ wherein i_s is an index value of the first paging occasion, and Ns is a quantity of paging occasions in the first paging frame.

In at least one embodiment, the first message is scrambled by using a first radio network temporary identity RNTI, where the first RNTI and a second RNTI are different RNTIs. A second message is scrambled by using the second RNTI, where the second message is used to page a second terminal device.

In at least one embodiment, the first message includes at least one of the first identity and a service type; or the first message is used to indicate the first terminal device to receive a third message, where the third message includes at least one of a first identity and a service type that are of a first service.

In at least one embodiment, the communication unit is configured to receive third indication information from the core network device, where the third indication information includes the first identity, and the third indication information is used to indicate to page at least one terminal device.

According to a sixth aspect, at least one embodiment provides a communication apparatus. The communication apparatus is a core network device or a chip disposed inside a core network device. The communication apparatus has a function of implementing the third aspect. For example, the communication apparatus includes a corresponding module, unit, or means for performing the steps in the third aspect. The function, the unit, or the means is implemented by software; is implemented by hardware; or is implemented by hardware executing corresponding software.

For example, the communication apparatus includes a receiving unit and a sending unit. The receiving unit is configured to receive service data of a first service. The sending unit is configured to send third indication information to a network device, where the third indication information includes a first identity of the first service, the first identity includes at least one of a service identity and a group identity, and the third indication information is used to indicate to page at least one terminal device.

In at least one embodiment, the third indication information further includes at least one of a DRX and a service type that are of the first service.

The communication apparatuses described in the fourth aspect to the sixth aspect correspond to the communication methods described in the first aspect to the third aspect, for related beneficial effects of the communication apparatuses described in the fourth aspect to the sixth aspect, refer to the first aspect to the third aspect. Details are not described herein again.

According to a seventh aspect, at least one embodiment provides a communication apparatus. The communication apparatus is a terminal device (or a chip disposed inside a terminal device), a network device (or a chip disposed inside a network device), or a core network device (or a chip disposed inside a core network device). The communication apparatus has functions for implementing the first aspect to the third aspect.

In at least one embodiment, the communication apparatus includes a processor, and further includes a transceiver. The transceiver is configured to receive and send a signal, and the processor executes program instructions, to complete the method according to the first aspect to the third aspect. The communication apparatus further includes one or more memories. The memory is configured to be coupled to the processor. The one or more memories is integrated with the processor, or is disposed independent of the processor. This is not limited in embodiments described herein. The memory stores a computer program or instructions for implementing the functions in the first aspect to the third aspect. The processor executes the computer program or the instructions stored in the memory. In response to the computer program or the instructions being executed, the communication apparatus is enabled to implement the method described with reference to the first aspect to the third aspect.

In at least one embodiment, the communication apparatus includes a processor and a memory. The memory stores a computer program or instructions for implementing the functions in the first aspect to the third aspect. The processor executes the computer program or the instructions stored in the memory. In response to the computer program or the instructions being executed, the communication apparatus is enabled to implement the method according to the second aspect or the fourth aspect.

In at least one embodiment, the communication apparatus includes at least one processor and an interface circuit. The at least one processor is configured to: communicate with another apparatus through the interface circuit, and perform the method according to the first aspect to the third aspect.

According to an eighth aspect, at least one embodiment provides a computer-readable storage medium. The computer storage medium stores computer-readable instructions. In response to a computer reading and executing the computer-readable instructions, the computer is enabled to perform the method according to the first aspect to the fourth aspect.

According to a ninth aspect, at least one embodiment provides a computer program product. In response to a computer reading and executing the computer program product, the computer is enabled to perform the method according to the first aspect to the fourth aspect.

According to a tenth aspect, at least one embodiment provides a chip. The chip includes a processor. The processor is coupled to a memory, and is configured to read and execute a software program stored in the memory, to implement the method according to the first aspect to the fourth aspect.

According to an eleventh aspect, at least one embodiment provides a communication system, including the communication apparatus according to the fourth aspect and the communication apparatus according to the fifth aspect, and further includes the communication apparatus according to the sixth aspect.

These aspects or other aspects of embodiments are clearer and more comprehensible in descriptions of the following embodiments.

BRIEF DESCRIPTION OF DRAWINGS

FIG. 6*a*-1 and FIG. 6*a*-2 are a schematic flowchart corresponding to a communication method according to at least one embodiment;

FIG. 7*a*-1 and FIG. 7*a*-2 are a schematic flowchart corresponding to a communication method according to at least one embodiment;

DESCRIPTION OF EMBODIMENTS

Figure 1:
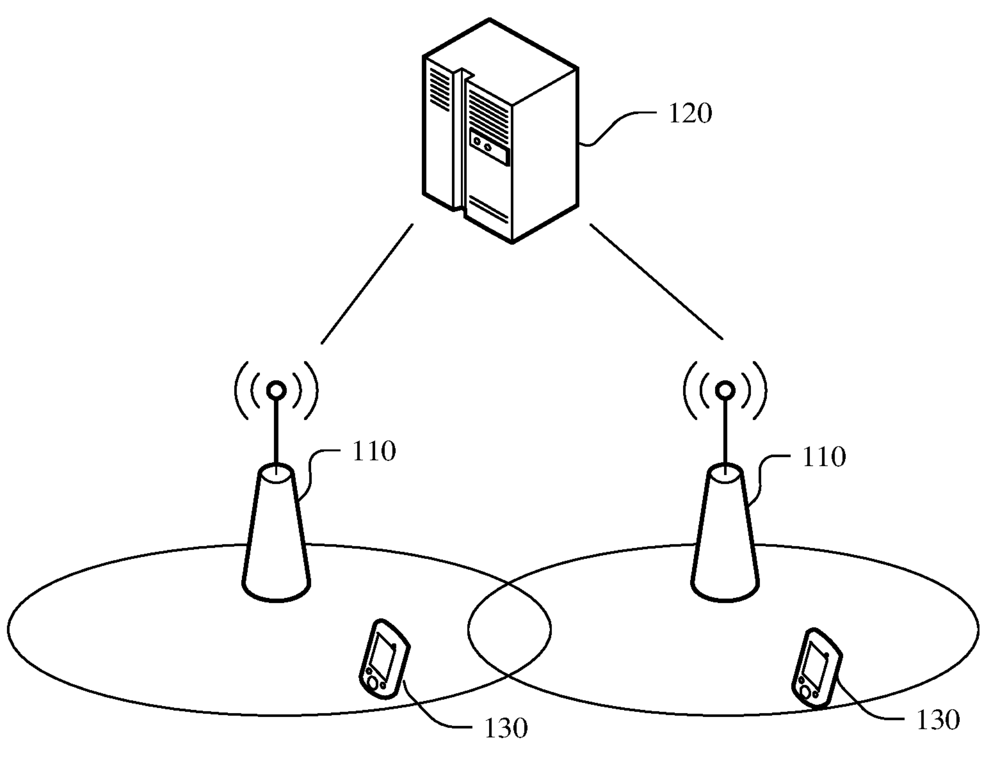
FIG. 1 is a schematic diagram of a possible system architecture according to at least one embodiment.

The following describes the technical solutions in at least one embodiment with reference to the accompanying drawings.

Some terms in embodiments of this application are first described, to help a person skilled in the art have a better understanding.

(1) Terminal device: The terminal device includes a device that provides voice and/or data connectivity for a user. The terminal device includes a device that provides voice for a user, includes a device that provides data connectivity for a user, or includes a device that provides voice and data connectivity for a user. For example, the terminal device includes a handheld device having a wireless connection function or a processing device connected to a wireless modem. The terminal device communicates with a core network via a radio access network (radio access network, RAN), and exchange voice or data with the RAN, or exchange voice and data with the RAN. The terminal device includes user equipment (user equipment, UE), a wireless terminal device, a mobile terminal device, a device-to-device (device-to-device, D2D) communication terminal device, a vehicle to everything (vehicle to everything, V2X) terminal device, a machine-to-machine/machine type communication (machine-to-machine/machine-type communication, M2M/MTC) terminal device, an Internet of things (Internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device includes a mobile phone (or referred to as a "cellular" phone), a computer with a mobile terminal device, or a portable, pocket-sized, handheld, or computer built-in mobile apparatus, for example, a device such as a personal communications service (personal communications service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

(2) Network device: The network device is a device in a wireless network. For example, the network device is a radio access network (radio access network, RAN) node (or device) that enables a terminal device to access the wireless network, and is also referred to as a base station. Currently, some examples of the RAN device are: a next generation NodeB (generation NodeB, gNodeB) in a 5G communication system, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless fidelity (wireless fidelity, Wi-Fi) access point (access point, AP), or the like. In addition, in a network structure, the network device includes a centralized unit (centralized unit, CU) node, a distributed unit (distributed unit, DU) node, or a RAN device including a CU node and a DU node. In addition, in another possible case, the network device is another apparatus that provides a wireless communication function for the terminal device. A specific technology and a specific device form that are used by the network device are not limited in embodiments described herein. For ease of description, in embodiments of this application, an apparatus that provides a wireless communication function for a terminal device is referred to as a network device.

(3) The terms "system" and "network" is interchangeably used in embodiments described herein. "At least one" means one or more, and "a plurality of" means two or more. The term "and/or" describes an association relationship between associated objects and indicates that three relationships exist. For example, A and/or B indicates the following cases: Only A exists, both A and B exist, and only B exists, where A and B is singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, "at least one of A, B, and C" includes A, B, C, AB, AC, BC, or ABC.

In addition, unless otherwise stated, ordinal numbers such as "first" and "second" are used to distinguish between a plurality of objects, and are not used to limit an order, a time sequence, priorities, or importance of the plurality of objects. For example, first information and second information are merely used to distinguish between different information, and do not indicate different priorities, importance, or the like of the two types of information.

The following describes a network architecture to which embodiments of this application are applicable.

FIG. 1 is a schematic diagram of a network architecture according to at least one embodiment. As shown in FIG. 1, a terminal device 130 accesses a wireless network, to obtain a service of an external network (for example, the Internet) through the wireless network, or communicate with another device through the wireless network, for example, communicates with another terminal device. The wireless network includes a radio access network (radio access network, RAN) device 110 and a core network (core network, CN) device 120. The RAN device 110 is configured to connect the terminal device 130 to the wireless network, and the CN device 120 is configured to manage the terminal device and provide a gateway for communicating with the external network. A quantity of devices in the communication system shown in FIG. 1 is merely used as an example. Embodiments described herein are not limited thereto. During actual application, the communication system further includes more terminal devices 130 and more RAN devices 110, and further includes another device.

A CN includes a plurality of CN devices 120. In response to the network architecture shown in FIG. 1 being applicable to a 5G communication system, the CN device 120 is an access and mobility management function (access and mobility management function, AMF) entity, a session management function (session management function, SMF) entity, a user plane function (user plane function, UPF) entity, or the like. In response to the network architecture shown in FIG. 1 being applicable to an LTE communication system, the CN device 120 is a mobility management entity (mobility management entity, MME), a serving gateway (serving gateway, S-GW), and the like.

Figure 2:
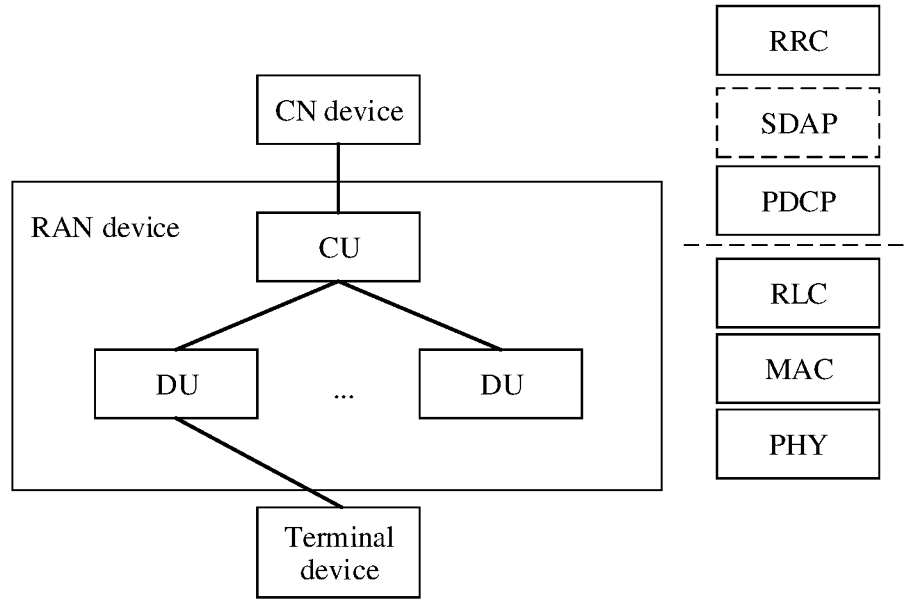
FIG. 2 is a schematic diagram of another network architecture according to at least one embodiment.

FIG. 2 is a schematic diagram of another network architecture to which embodiments of this application are applicable. As shown in FIG. 2, the network architecture includes a CN device, a RAN device, and a terminal device. The RAN device includes a baseband apparatus and a radio frequency apparatus. The baseband apparatus is implemented by one node, or is implemented by a plurality of nodes. The radio frequency apparatus is independently implemented remotely from the baseband apparatus, or is integrated into the baseband apparatus, or a part of the radio frequency apparatus is implemented remotely from the baseband apparatus and a remaining part is integrated into the baseband apparatus. For example, in an LTE communication system, a RAN device (eNB) includes a baseband apparatus and a radio frequency apparatus. The radio frequency apparatus is remotely disposed relative to the baseband apparatus. For example, a remote radio unit (remote radio unit, RRU) is remotely disposed relative to a BBU.

Communication between the RAN device and the terminal device complies with a specific protocol layer structure. For example, a control plane protocol layer structure includes functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure includes the functions of the protocol layers such as the PDCP layer, the RLC layer, the MAC layer, and the physical layer. In at least one embodiment, a service data adaptation protocol (service data adaptation protocol, SDAP) layer is further included above the PDCP layer.

The RAN device may implement the functions of the protocol layers such as the RRC layer, the PDCP layer, the RLC layer, and the MAC layer through one node or a plurality of nodes. For example, in an evolved structure, the RAN device includes a CU and DU, and a plurality of DUs is centrally controlled by one CU. As shown in FIG. 2, the CU and the DU is divided based on a protocol layer of a wireless network. For example, functions of the PDCP layer and a layer above the PDCP layer are set in the CU, and functions of protocol layers below the PDCP layer, such as the RLC layer and the MAC layer, are set in the DU.

Division based on the protocol layer is merely an example, and division is alternatively performed based on another protocol layer. For example, division is performed based on the RLC layer. Functions of the RLC layer and a protocol layer above the RLC layer are set in the CU, and a function of a protocol layer below the RLC layer is set in the DU. Alternatively, division is performed based on a protocol layer. For example, a part of functions of the RLC layer and a function of a protocol layer above the RLC layer are set in the CU, and a remaining function of the RLC layer and a function of a protocol layer below the RLC layer are set in the DU. In addition, division is alternatively performed in another manner. For example, the division is performed based on a latency. A function whose processing time satisfies a latency set in the DU, and a function whose processing time does not satisfy the latency set in the CU.

In addition, the radio frequency apparatus is not placed in the DU but is placed remotely from the DU, or is integrated into the DU, or a part of the radio frequency apparatus is placed remotely from the DU and a remaining part is integrated into the DU. This is not limited herein.

Figure 3:
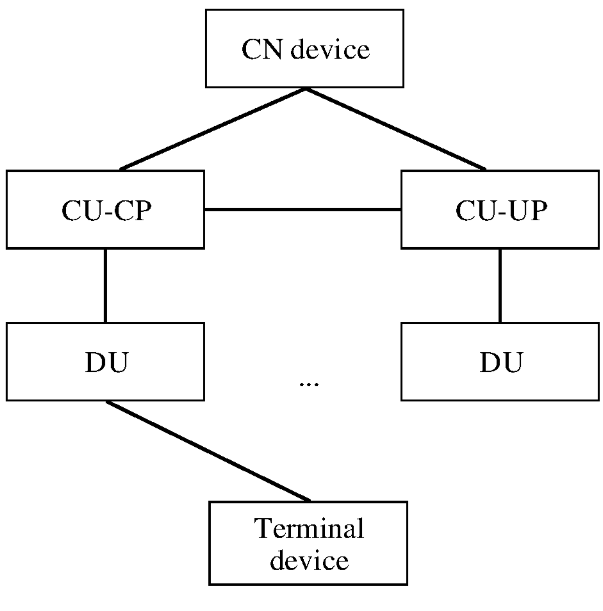
FIG. 3 is a schematic diagram of another network architecture according to at least one embodiment.

FIG. 3 is a schematic diagram of another network architecture according to at least one embodiment. Compared with the network architecture shown in FIG. 2, in the network architecture shown in FIG. 3, a control plane (CP) and a user plane (UP) that are of a CU is alternatively separated and implemented as different entities: a control plane (control plane, CP) CU entity (namely, a CU-CP entity) and a user plane (user plane, UP) CU entity (namely, a CU-UP entity).

In the foregoing network architecture, signaling generated by the CU is sent to a terminal device through a DU, or signaling generated by a terminal device is sent to the CU through a DU. The DU transparently transmits the signaling to the terminal device or the CU by directly encapsulating the signaling at a protocol layer without parsing the signaling. In the following embodiments, in response to transmission of such signaling between the DU and the terminal device being involved, sending or receiving of the signaling by the DU includes this scenario. For example, signaling at an RRC layer or a PDCP layer is finally processed as signaling at a PHY layer and sent to the terminal device, or is converted from received signaling at a PHY layer. In this architecture, the signaling at the RRC layer or the PDCP layer is sent by the DU, or is sent by the DU and a radio frequency apparatus.

The network architecture shown in FIG. 1, FIG. 2, or FIG. 3 is applicable to various communication systems of a radio access technology (radio access technology, RAT). For example, the communication system is an LTE communication system, or is a 5G (which is also referred to as new radio (new radio, NR)) communication system, or is a transition system between an LTE communication system and a 5G communication system, or certainly is a future communication system. The transition system is also referred to as a 4.5G communication system. Network architectures and service scenarios described in embodiments herein are intended to describe the technical solutions in embodiments described herein more clearly, and do not constitute any limitation on the technical solutions provided in embodiments described herein. A person of ordinary skill in the art knows that, with evolution of the communication network architecture and emergence of new service scenarios, the technical solutions provided in embodiments described herein are also applicable to resolving similar technical problems.

An apparatus in at least one embodiment is located in a terminal device or a network device based on a function implemented by the apparatus. In response to the foregoing CU-DU structure being used, the network device is a CU node, a DU node, or a RAN device including a CU node and a DU node.

Figure 4A:
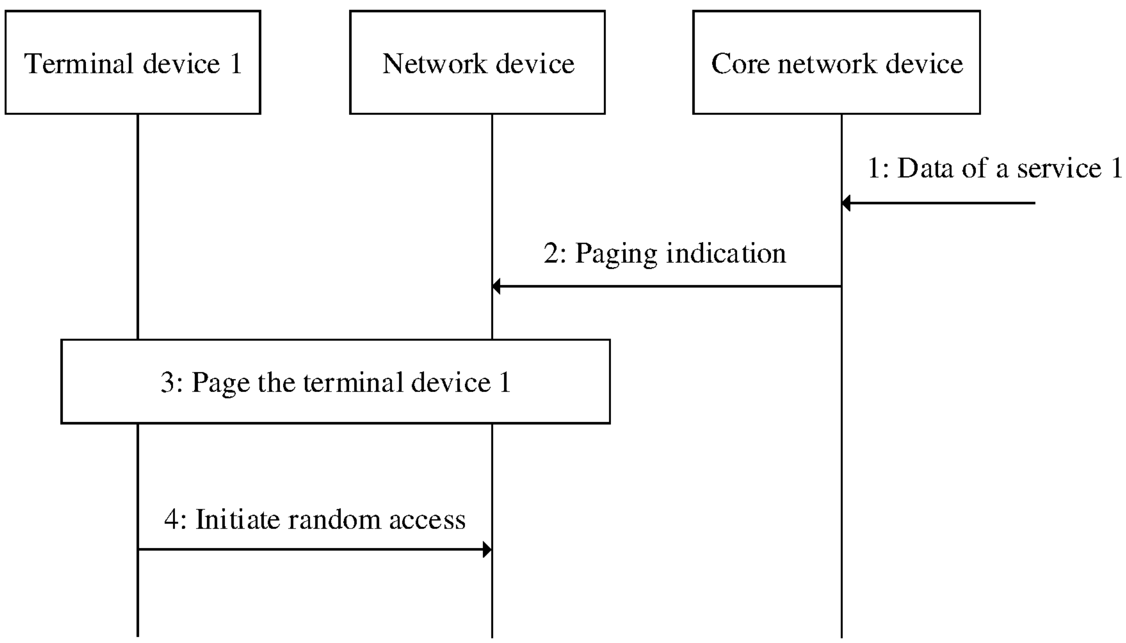
FIG. 4*a* is a schematic flowchart of downlink data transmission of a service 1 according to at least one embodiment.

In the network architecture shown in FIG. 1, FIG. 2, or FIG. 3, downlink data transmission is used as an example, and the terminal device receives data of one or more services. FIG. 4*a* is a schematic flowchart of downlink data transmission of a service 1. As shown in FIG. 4*a*, the downlink data transmission of the service 1 includes the following steps.

Step 1: A core network device receives data of the service 1.

Step 2: The core network device sends a paging indication to a network device.

For example, after receiving the data of the service 1, in response to determining that a terminal device interested in the service 1 is a terminal device 1, the core network device learns that the data is sent to the terminal device 1, and then sends the paging indication to the network device. The paging indication includes an identity of the terminal device 1.

Step 3: After receiving the paging indication, the network device pages the terminal device 1.

Figure 4B:
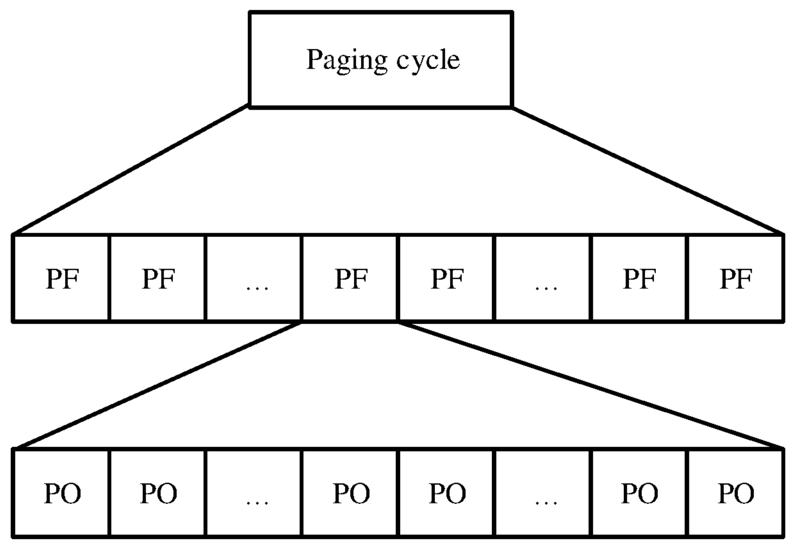
FIG. 4*b* is a schematic diagram of a paging frame and a paging occasion according to at least one embodiment.

In response to the network device paging the terminal device 1, the network device periodically pages the terminal device 1. As shown in FIG. 4*b*, one paging cycle includes a plurality of paging frames (paging frames, PFs), and a PF includes a plurality of paging occasions (paging occasions, POs). The network device determines, based on the identity of the terminal device 1, a PO corresponding to the terminal device 1, to send downlink control information (downlink control information, DCI) (where the DCI is for scheduling a paging message) on the PO corresponding to the terminal device 1, and send the paging message on a time-frequency resource indicated by the DCI. Correspondingly, the terminal device 1 also determines, based on the identity of the terminal device 1, the PO corresponding to the terminal device 1, to monitor the DCI on the PO, and receive the paging message and obtain specific content of the paging message based on the received DCI.

Step 4: After receiving the paging message, the terminal device 1 initiates a random access process to the network device, to perform data communication.

The foregoing example is a scenario in which one service pages one terminal device. In a scenario in which a plurality of services page a plurality of terminal devices, for example, data of a service 2 also arrives at the same time in addition to the data of the service 1, and a terminal device 2 is paged. For paging the terminal device 2 by the network device, refer to the descriptions of paging the terminal device 1 by the network device. Details are not described again.

In addition, for example, the paging message includes a paging record list (PagingRecordlist), where the paging record list includes identities of one or more terminal devices. After receiving the paging message, in response to determining that the paging record list includes the identity of the terminal device 1, the terminal device 1 initiates the random access process to the network device, to establish an RRC connection; or in response to determining that the paging record list not including the identity of the terminal device 1, the terminal device 1 continues performing monitoring.

In at least one embodiment, for a groupcast or multicast transmission scenario, a plurality of terminal devices are simultaneously paged in response to data of a service arriving.

For example, a multimedia broadcast multicast service (multimedia broadcast multicast service, MBMS) is a service oriented to a plurality of terminal devices, for example, live broadcast or scheduled program playback. A multicast transmission technology is a technology in which the MBMS is simultaneously sent to the plurality of terminal devices via a network device. The MBMS is sent to the terminal device in a unicast manner by establishing a bearer dedicated to the terminal device between the network device and the terminal device, or is sent to the terminal device in a broadcast manner by establishing a bearer dedicated to the MBMS between the network device and the terminal device. In response to a plurality of terminal devices receiving MBMS data, and in response to the data being sent in a unicast manner, bearers dedicated to a large quantity of terminal devices are established, and a large quantity of resources are consumed; or in response to the data being sent to the terminal device in a multicast manner, an MBMS-dedicated bearer is established, and terminal devices interested in the service receive the MBMS data. Therefore, in response to a plurality of terminal devices being interested in a same service, the network device receives the service from a core network, and then sends the service to the plurality of terminal devices in a multicast manner.

A mission-critical push-to-talk (mission-critical push-to-talk, MCPTT) scenario is a scenario in which the multicast transmission technology is used. In at least one embodiment, the mission-critical push-to-talk scenario includes: an initiating terminal device sends a request to a network side to communicate with a plurality of receiving terminal devices. After acknowledging a communication request from the terminal device, the network side initiates a paging procedure to the plurality of receiving terminal devices. After being paged, the receiving terminal devices initiate the random access process, to enter a connected state to communicate with the initiating terminal device.

In response to data of a service arriving, in response to a large quantity of terminal devices that is to receive the data of the service being in an idle state or an inactive state, the network device separately pages these terminal devices, resulting in high resource overheads. For example, the network device determines, based on an identity of a terminal device, a paging occasion corresponding to the terminal device, and then sends DCI on the paging occasion corresponding to the terminal device, resulting in high signaling overheads and high transmission resource overheads. For another example, a paging record list included in a paging message sent by the network device includes identities of the large quantity of terminal devices, resulting in high paging message resource overheads.

Based on this, at least one embodiment provide a paging method and an apparatus, to reduce resource overheads. In the following descriptions, an example in which the method provided in embodiments described herein is applicable to the system architecture shown in FIG. 1 is used. In addition, the method is performed by two communication apparatuses: a first communication apparatus and a second communication apparatus. The first communication apparatus is a network device or a communication apparatus that supports the network device to implement functions for the method, or certainly is another communication apparatus such as a chip or a chip system. The second communication apparatus is a terminal device or a communication apparatus that supports the terminal device to implement functions for the method, or certainly is another communication apparatus such as a chip or a chip system. For ease of description, the following uses an example in which the method is performed by a network device and a terminal device, namely, an example in which the first communication apparatus is the network device and the second communication apparatus is the terminal device. At least one embodiment is applicable to the system architecture shown in FIG. 1, a network device (for example, a network device configured to perform the embodiment shown in FIG. 5) described below is the network device in the system architecture shown in FIG. 1, and a terminal device (for example, a terminal device configured to perform the embodiment shown in FIG. 5) described below is the terminal device in the system architecture shown in FIG. 1.

At least one embodiment provides solutions to reduce resource overheads from different perspectives. For example, in a possible solution, the terminal device or the network device obtains a first identity of a first service, and determines a first paging occasion based on the first identity, where the first paging occasion is used by the terminal device to receive a first message, and the first message is used to page the terminal device. In this method, the first paging occasion is determined based on the first identity, so that the network device pages, on the first paging occasion, a plurality of terminal devices that receive data of the first service. Compared with a manner in which the network device pages a plurality of terminal devices on paging occasions respectively corresponding to the plurality of terminal devices, using this method effectively reduces paging signaling overheads and further reduce resource overheads, and effectively reduce processing burden of the network device because the network device does not separately calculate paging occasions corresponding to the plurality of terminal devices.

In another possible solution, the network device sends a paging message, where the paging message includes service information of a first service. Accordingly, after receiving the paging message, the terminal device initiates a random access process based on the paging message to receive data of the first service. Optionally, before initiating random access, the terminal device determines, based on the service information of the first service, that the first service is a service that the terminal device is interested in. In this method, the paging message no longer includes identities of terminal devices that receive the first service. Because a quantity of bits occupied by the service information of the first service is less than a quantity of bits occupied by the identities of the terminal devices that receive the first service, resource overheads of the paging message is effectively reduced. In addition, the service information of the first service is included in the paging message, so that the terminal device learns in advance that a purpose of paging this time is to receive the data of the first service. Therefore, the terminal device performs processing on the first service in the random access process, for example, increase a random access priority or use an individual set of a random access parameter.

In another possible solution, the terminal device determines a first period, and initiates random access after the first period. In this method, in response to a large quantity of terminal devices initiating random access based on the paging message, because the terminal devices initiates random access after the first period, and first periods of different terminal devices is different, this can effectively avoid a collision or a conflict caused in response to the large quantity of terminal devices simultaneously initiating random access, effectively improve a random access success rate, and avoid an access latency and resource overheads caused in response to the terminal device re-initiating random access due to a random access failure.

The foregoing plurality of solutions provided in at least one embodiment is separately implemented, or at least two solutions is implemented in a combination manner.

In at least one embodiment, services is classified into different service types. For example, the services is classified into a unicast service type and a multicast (groupcast) service type (this classification manner is a coarse-grained classification manner). A service classified into the unicast service type is understood as a service oriented to one terminal device, and a service classified into the multicast service type is understood as a service oriented to a plurality of terminal devices. The services is alternatively classified into different service types based on another possible dimension. For example, a multicast service is classified into a live broadcast service type, an on-demand service type, or the like (this classification manner is a fine-grained classification manner). For another example, a service type is alternatively classified in a finer-grained manner (based on a QoS quality of service requirement of a service or another service feature). This is not limited. In at least one embodiment, for ease of description, a service type of a service includes a first service type and/or a second service type. The first service type is the unicast service type or the multicast service type. The second service type is a service type based on another dimension, for example, is the live broadcast service type or the on-demand service type.

Embodiment 1

Figure 5:
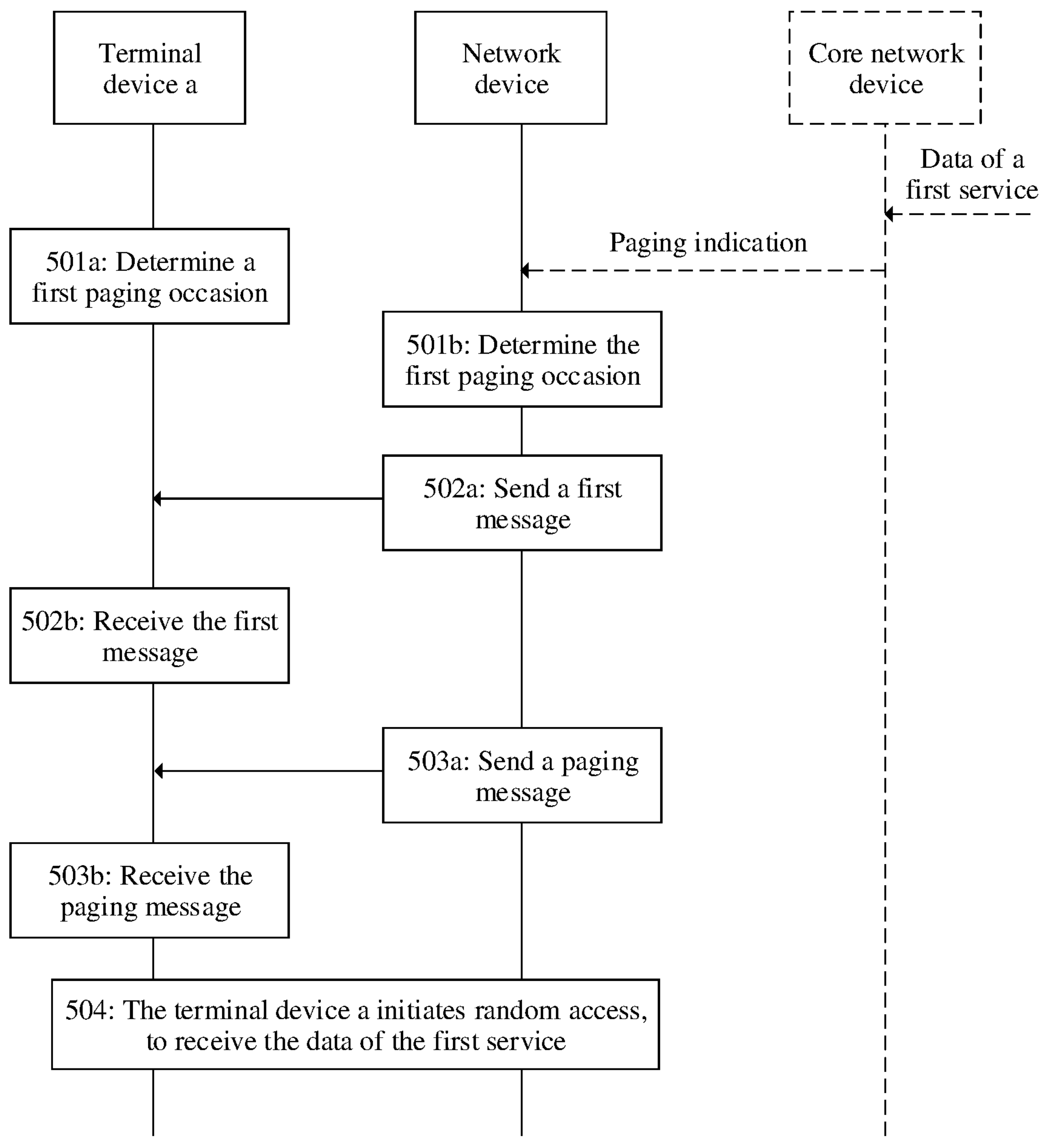
FIG. 5 is a schematic flowchart corresponding to a communication method according to at least one embodiment.

FIG. 5 is a schematic flowchart corresponding to a communication method according to at least one embodiment. As shown in FIG. 5, the method includes the following steps.

Step 501*a*: A terminal device determines a first paging occasion.

The terminal device herein is a terminal device that receives a first service, where a service type of the first service is a multicast service type (in other words, the first service is a multicast service). For example, there is a plurality of terminal devices that receive the first service. For example, the terminal devices includes a terminal device a, a terminal device b, and a terminal device c. For ease of description, only the terminal device a is used as an example. The first paging occasion is used by the terminal device a to receive a first message, where the first message is used to page the terminal device a based on the first service.

Step 501*b*: A network device determines the first paging occasion.

For example, the network device and the terminal device a determines the first paging occasion in a same manner. The following describes two embodiments: embodiment 1a and embodiment 2a.

Embodiment 1a

The network device and the terminal device a obtain an identity of the first service, and further determine the first paging occasion based on a first identity of the first service. For example, the network device and the terminal device a first determine a first paging frame based on the first identity, and further determine the first paging occasion in the first paging frame based on the first identity. The first identity includes at least one of a service identity (service ID) and a group identity. Alternatively, the first identity is other information that identifies the first service, for example, a value corresponding to the first service. The group identity is a temporary mobile group identity (temporary mobile group identity, TMGI).

In an example, the network device and the terminal device a further obtains a DRX (which is referred to as a DRX-1 for ease of description), to determine the first paging occasion based on the first identity and the DRX-1. For example, the network device and the terminal device a determine the first paging frame based on the first identity and the DRX-1, and then determine the first paging occasion in the first paging frame based on the first identity.

The first paging frame determined based on the first identity and the DRX-1 satisfies the following formula:

$$(SFN+PF\_offset) \bmod T=(T \text{ div } N)*(S\_ID \bmod N) \quad \text{formula (1), wherein}$$

SFN is a frame number of the first paging frame, PF_offset is an offset corresponding to the first paging frame, T is the DRX-1, N is a quantity of paging frames in the DRX-1, and S_ID is the identity of the first service.

The first paging occasion satisfies the following formula:

$$i\_s=\text{floor}(S\_ID/N) \bmod Ns \quad \text{formula (2), wherein}$$

i_s is an index value of the first paging occasion, and Ns is a quantity of paging occasions in the first paging frame.

The following describes at least one embodiment in which the terminal device a obtains the first identity and the DRX-1.

1. The Terminal Device a Obtains the First Identity

For example, the terminal device a obtains the first identity in a plurality of manners. The following describes two possible manners.

Manner 1: The first identity is predefined in the terminal device or a protocol. For example, a mapping relationship between a service and an identity is preset in the terminal device or the protocol. In this way, a terminal device (for example, the terminal device a) interested in the first service learns of the first identity of the first service.

Manner 2: The terminal device a obtains service information of the first service from a core network device, and then obtain the first identity based on the service information of the first service. The service information of the first service includes the first identity. Alternatively, the service information of the first service includes indication information, where the indication information is used to indicate the first identity, and the terminal device a obtains the first identity based on the indication information. For example, the indication information is the service type of the first service. A correspondence between a first identity and a service type is preset, so that the terminal device a obtains the first identity based on the service type of the first service.

For example, the terminal device a sends a request message to the core network device, so that the core network device sends the service information of the first service to the terminal device a based on the request message. The request message includes a second identity of a service (for example, the first service) that the terminal device a is interested in, where the second identity is information different from the first identity. For example, the second identity is a service name or an index corresponding to the service. The service that the terminal device a is interested in is set by a user of the terminal device a based on input from the user. This is not limited. The request message is a message dedicated to requesting service information, or is a registration request message, an attach request message, another possible non-access stratum (non-access stratum, NAS) message, or a message above the NAS (for example, an application layer). This is not limited.

For example, from a perspective of the core network device, after receiving the request message, the core network device determines that the first service requested by using the request message is a multicast service, and further sends the service information of the first service to the terminal device a. In another example, in response to the core network device determining that the first service requested by using the request message is a unicast service, the core network device no longer sends the service information of the first service to the terminal device a.

In other words, the core network device and a terminal device exchange related information. For example, the terminal device requests, from the core network device, a service that the terminal device is interested in, and the core network sends, to the terminal device, service information of the service that the terminal device is interested in. After the exchange is completed, the terminal device and the core network device learn of the related information. Subsequently, in response to performing paging, the core network device determines, based on the related information, a terminal device to page, and indicates the related information to the network device.

2. The Terminal Device a Obtains the DRX-1

For example, the terminal device a obtains the DRX-1 in a plurality of manners. For example, in response to the network device configuration a DRX (which is referred to as a DRX-2) for the terminal device a by using RRC signaling, and broadcasting a DRX (which is referred to as a DRX-3) in a broadcast message, the terminal device a determines the DRX-1 based on at least one of the DRX-2 and the DRX-3. For example, the terminal device a determines the DRX-1 based on the DRX-2 and the DRX-3. In this case, the determined DRX-1 is a smaller one of the DRX-2 and the DRX-3, or is one selected from the DRX-2 and the DRX-3 in a protocol-agreed manner. For another example, the terminal device a obtains a DRX (which is referred to as a DRX-4) of the first service, and then determine the DRX-1 based on at least one of the DRX-2, the DRX-3, and the DRX-4, for example, determine the DRX-1 based on the DRX-2, the DRX-3, and the DRX-4. In this case, the determined DRX-1 is a smallest one of the DRX-2, the DRX-3, and the DRX-4, or is one selected from the DRX-2, the DRX-3, and the DRX-4 in the protocol-agreed manner. For example, the DRX-4 is selected as the DRX-1. The DRX is alternatively understood as a paging cycle, and different services correspond to different DRXs. For example, a DRX or a paging cycle corresponding to a service 1 is 100 ms, and a DRX or a paging cycle corresponding to a service 2 is 80 ms.

A manner in which the terminal device a obtains the DRX of the first service is the same as the manner in which the terminal device a obtains the first identity of the first service. For example, the service information that is of the first service and that is sent by the core network device to the terminal device a further includes the DRX of the first service.

In other words, the service information that is of the first service and that is sent by the core network device to the terminal device a includes the first identity and the DRX of the first service, or includes the service type and the DRX that are of the first service, or includes the first identity, the service type, and the DRX that are of the first service. The service information of the first service further includes other possible information. This is not limited.

The following describes at least one embodiment in which the network device obtains the first identity and the DRX-1.

For example, the network device obtains service information of the first service from the core network device. For example, after receiving data of the first service, in response to determining that the first service is a multicast service, the core network device sends third indication information to the network device. The third indication information is a paging indication, where the paging indication includes the service information of the first service, and the service information of the first service includes the first identity. Correspondingly, the network device obtains the first identity based on the paging indication. Optionally, the service information of the first service further includes the DRX-4, so that the network device determines the DRX-1 based on the DRX-2, the DRX-3, and the DRX-4.

The service information that is of the first service and that is sent by the core network device to the terminal device a is the same as the service information that is of the first service and that is sent by the core network device to the network device.

In an optional solution, the paging indication further includes an identity of the terminal device that receives the first service, for example, an identity of the terminal device a, an identity of the terminal device b, and an identity of the terminal device c. Herein, the terminal device that receives the first service is the terminal device that is interested in the first service. Refer to the foregoing descriptions, the core network device learns of, based on a request message of the terminal device, a service that the terminal device is interested in, and further determine, after receiving the data of the first service, the terminal device that receives the first service. For ease of description, only three terminal devices are shown herein. In at least one embodiment, a quantity of terminal devices that receive the data of the first service is far greater than three.

Embodiment 2a

The network device and the terminal device a determines the first paging occasion based on an identity of the terminal device a. The identity of the terminal device a is an international mobile subscriber identity (international mobile subscriber identification, IMSI) number of the terminal device a, a temporary mobile subscriber identity (temporary mobile subscriber identification, TMSI) number of the terminal device a, or other information used to identify the terminal device a.

For example, the network device and the terminal device a further obtains a DRX (which is referred to as, for example, a DRX-1), to determine the first paging occasion based on a first identity and the DRX-1. For example, the network device and the terminal device a first determine a first paging frame based on the first identity and the DRX-1, and then determine the first paging occasion in the first paging frame based on the first identity.

The first paging frame determined based on the identity of the terminal device a and the DRX-1 satisfies the following formula:

$$(SFN+PF\_offset) \bmod T=(T \text{ div } N)*(UE\_ID \bmod N)$$ Formula (3), where SFN is a frame number of the first paging frame, PF_offset is an offset corresponding to the first paging frame, T is the DRX-1, N is a quantity of paging frames in the DRX-1, and UE_ID is the identity of the terminal device a.

The first paging occasion satisfies the following formula:

$$i\_s=\text{floor}(UE\_ID/N)\bmod Ns \qquad \text{formula (4), where}$$

i_s is an index value of the first paging occasion, and Ns is a quantity of paging occasions in the first paging frame.

In at least one embodiment, the identity (for example, the IMSI) of the terminal device a is stored in a SIM card of the terminal device a, so that the terminal device a obtains the identity of the terminal device a from the SIM card. For a manner in which the terminal device a obtains the DRX-1, refer to the descriptions in the foregoing embodiment 1a.

The network device obtains the identity of the terminal device a from a core network device. For example, after receiving data of the first service, in response to determining that the first service is the multicast service, the core network device sends a paging indication to the network device, where the paging indication includes the identity of the terminal device a. In an optional solution, the paging indication further includes service information of the first service. For descriptions of the service information of the first service, refer to the foregoing descriptions. A manner in which the network device determines the DRX-1 is the same as the manner in which the terminal device a determines the DRX-1, and details are not described again.

Step 502*a*: The network device sends the first message on the first paging occasion, where the first message is downlink control information (downlink control information, DCI).

Accordingly, in step 502*b*, the terminal device a receives the first message on the first paging occasion.

In at least one embodiment, the first message is scrambled by using a plurality of possible scrambling code. Scrambling is a method for processing a digital signal, where an exclusive OR operation is performed on an original signal by using scrambling code to obtain a new signal. The scrambling code is for scrambling and descrambling the original signal. For example, the DCI is scrambled by using the scrambling code. A cyclic redundancy check (cyclic redundancy check, CRC) field of the DCI is scrambled. Correspondingly, the terminal device descrambles the received DCI. The terminal device descrambles the CRC field of the DCI by using scrambling code of a corresponding type, to determine a format, a type, or the like of the DCI. the foregoing manner is merely an example, and scrambling and descrambling manners are not limited in at least one embodiment.

The following describes two embodiments of scrambling the first message: embodiment 1b and embodiment 2b.

Embodiment 1b

The first message is scrambled by using a paging radio network temporary identity (paging radio network temporary identity, P-RNTI).

Embodiment 2b

The first message is scrambled by using a first RNTI, and a second message (which is DCI) is scrambled by using a second RNTI. The second message is for paging a terminal device d based on a second service. The first service and the second service are of different service types. For example, a first service type of the second service is different from a first service type of the first service, or a second service type of the second service is different from a second service type of the first service. The first RNTI and the second RNTI are different RNTIs. For example, the first RNTI and the second RNTI have different values, and/or the first RNTI and the second RNTI are different types of RNTIs.

In at least one embodiment, in response to the first service type of the second service being different from the first service type of the first service (the first service is the multicast service, and the second service is a unicast service), the second RNTI is a P-RNTI, and the first RNTI is a newly defined RNTI. For example, the first RNTI is scrambling code/a radio access network temporary identity predefined in a protocol for the multicast service, or is configured by the network device for the multicast service before a paging process and sent to the terminal device by using a broadcast message (where the broadcast message is RRC signaling).

In response to the second service type of the second service being different from the second service type of the first service (for example, the first service is a live broadcast service, and the second service is an on-demand service), the second RNTI is a newly-defined RNTI, and the first RNTI is a newly-defined RNTI.

In the foregoing method, the first message is scrambled by using the first RNTI. Therefore, in response to the first paging occasion and a second paging occasion (where the second paging occasion is used by the terminal device d to receive the second message) overlapping in time domain, in response to the network device intending to perform paging on the first paging occasion, the terminal device a receives the first message because the terminal device a monitors on the first paging occasion based on the first RNTI. However, the terminal device d cannot receive the first message (for example, the terminal device d cannot parse the first message) because the terminal device d monitors on the first paging occasion based on the second RNTI, and does not further receive a third message based on the first message. This effectively avoids additional processing burden caused in response to a terminal device (for example, the terminal device d) receiving the first message. In response to the network device intending to perform paging only on the second paging occasion, the terminal device d receives the second message because the terminal device d monitors on the first paging occasion based on the second RNTI. However, the terminal device a cannot receive the second message because the terminal device a monitors on the first paging occasion based on the first RNTI. This avoids additional processing burden caused in response to a terminal device (for example, the terminal device a) receiving the second message.

In at least one embodiment, the network device configures that the first paging occasion and the second paging occasion do not overlap in time domain. The second paging occasion is used by the terminal device d to receive the second message. For example, the network device configures a time domain range (which is referred to as a time domain range 1) for the first paging frame in which the first paging occasion is located, and configure a time domain range (which is referred to as a time domain range 2) for a second paging frame in which the second paging occasion is located. The time domain range 1 and the time domain range 2 do not overlap in time domain, so that the first paging occasion and the second paging occasion do not overlap in time domain. In this way, in response to the first paging occasion and the second paging occasion overlapping in time domain, this effectively avoids the additional processing burden caused in response to the terminal device (for example, the terminal device a) receiving the second message or the additional processing burden caused in response to the terminal device (for example, the terminal device d) receiving the first message. For example, the time domain range 1 or the time domain range 2 includes a segment of consecutive time domain resources, or includes a plurality of segments of inconsecutive time domain resources. In other words, The time domain range 1 or the time domain range 2 includes consecutive time domains herein.

Note that: (1) In response to the first message and the second message being scrambled by using different RNTIs, the network device no longer configures the first paging occasion and the second paging occasion, which do not overlap in time domain. In response to the network device configuring that the first paging occasion and the second paging occasion not overlapping in time domain, the first message and the second message is scrambled by using a same RNTI, for example, by using the P-RNTI. (2) In response to the first paging occasion and the second paging occasion overlapping in time domain, and in response to the network device intending to perform paging based on the first paging occasion, a terminal device that monitors on the second paging occasion also wakes up to monitor a PDCCH to receive DCI. However, no paging is actually performed on the second paging occasion, and the terminal device that monitors on the second paging occasion continues to receive a paging message based on the DCI. In this case, the terminal device is disturbed, and power is wasted. This problem is effectively resolved by using either of the foregoing two solutions (for example, the first message and the second message are scrambled by using the different RNTIs, or the network device configures that the first paging occasion and the second paging occasion do not overlap in time domain).

In at least one embodiment, the first message includes the service information of the first service (for example, reference is made to the descriptions in embodiment 1a or embodiment 2a, and the network device obtains the service information of the first service from the core network device). In this way, after receiving the first message, the terminal device a determines that the service information of the first service included in the first message is service information of a service that the terminal device a is interested in, and then receives the third message based on the first message. In at least one embodiment, in response to the terminal device a determining that the service information of the first service included in the first message is not service information of a service that the terminal device a is interested in, the terminal device a continues monitoring. In addition, the terminal device a learns, based on the service information of the first service, in advance that a reason for paging performed by the network device this time is that the data of the first service is to be received.

Step 503*a*: The network device sends the third message, where the third message is the paging message.

Accordingly, in step 503*b*, the terminal device a receives the paging message.

In an example, the paging message includes a paging record list, and the paging record list includes the identity of the terminal device that is to receive the first service, for example, the identity of the terminal device a. In this way, after receiving the paging message, in response to determining that the paging message includes the identity of the terminal device a, the terminal device a initiates a random access process to establish a connection to receive the data of the first service. In another possible example, after receiving the paging message, in response to determining that the paging message does not include the identity of the terminal device a, the terminal device a continues performing monitoring.

In at least one embodiment, the paging message includes the service information of the first service. Further, the paging message may no longer include the identity of the terminal device that is to receive the first service. In this way, after the terminal device a receives the paging message based on the first message, in response to the paging message not including the identity of the terminal device a, and the included service information of the first service is the service information of the first service that the terminal device a is interested in, the terminal device a initiates the random access process to establish the connection to receive the data of the first service. In addition, because the paging message no longer includes the identity of the terminal device that is to receive the first service, resource overheads of the paging message is effectively reduced.

Step 504: The terminal device a initiates random access, to receive the data of the first service.

For example, the terminal device a determines a first period, and initiate random access after the first period. A unit of the first period is a time unit based on absolute time (for example, coordinated universal time (coordinated universal time, UTC) or global positioning system (global positioning system, GPS) time), for example, second, millisecond, microsecond, or nanosecond; or is a slot, a mini-slot, or a subframe; or is another possible time unit. This is not limited. The terminal device a initiates random access after the first period, where the first period is understood as a time offset. For example, a first moment is used as a reference moment, and the first moment is a moment at which the first paging occasion is located or a start moment or an end moment of the first paging occasion. In this case, the terminal device a may use the first moment as a start moment of waiting, and initiate random access after the first period. For another example, a first moment is used as a reference moment, and is a moment at which a time domain resource carrying the paging message is located or a start moment or an end moment of the time domain resource carrying the paging message. In this case, the terminal device a may use the first moment as a start moment of waiting, and initiate random access after the first period. In at least one embodiment, the reference moment is the first moment plus an offset, or another possible moment is used as the reference moment. For example, the reference moment is a preconfigured or an agreed moment in a paging process. This is not limited.

The terminal device a determines the first period in a plurality of manners. The following describes two possible embodiments: embodiment 1c and embodiment 2c.

Embodiment 1c

The terminal device a determines the first period based on the identity of the terminal device a and a quantity of groups. For example, a plurality of terminal devices that is to receive the first message on the first paging occasion is grouped into different groups. For example, the terminal device a, the terminal device b, and the terminal device c are grouped into two groups. The terminal device a and the terminal device b belong to a group 1, and the terminal device c belongs to a group 2. The terminal device a obtains the quantity of groups. For example, the quantity of groups is configured by the network device and sent to the terminal device a. For example, the network device determines, based on a latest resource state or load state, a maximum quantity or a quantity range of terminal devices that simultaneously initiate random access, to further determine the quantity of groups. In at least one embodiment, the network device determines the quantity of groups based on a quantity of terminal devices that is to be simultaneously paged and the maximum quantity of terminal devices that simultaneously initiate random access. For example, the quantity of groups is sent to the terminal device a by using a broadcast message or RRC signaling. The broadcast message or the RRC signaling includes first indication information, where the first indication information is used to indicate the quantity of groups. For another example, the quantity of groups is a protocol-agreed value. For another example, a mapping relationship between the service information of the first service and the quantity of groups is pre-specified, so that the terminal device determines the quantity of groups based on the service information of the first service. For another example, the quantity of groups is sent by the network device to the terminal device by using DCI (where the DCI is used to schedule the paging message) or the paging message, where the DCI or the paging message includes the first indication information.

In an example of this manner, the terminal device a determines the first period based on the identity of the terminal device a and the quantity of groups. For example, the first period determined by the terminal device a based on the identity of the terminal device a and the quantity of groups is equal to [(UE_ID) mod X]*t, where mod indicates a modulo operation, X is the quantity of groups, and t is a second period. The second period is protocol-agreed, or is configured by the network device and sent to the terminal device a. For example, the network device sends the second period to the terminal device a by using a broadcast message or RRC signaling, where the broadcast message or the RRC signaling includes second indication information, and the second indication information is used to indicate the second period. In an example, the network device sends the first indication information and the second indication information by using a same broadcast message or a same piece of RRC signaling.

The unit of the first period is the same as a unit of the second period. For example, the unit of the first period is an absolute time unit, for example, millisecond, or second; or is a relative time unit, for example, a symbol, a slot, a subframe, or a frame. In this case, first periods determined by terminal devices that belong to different groups in the plurality of terminal devices are different, and the plurality of terminal devices are terminal devices that receive the first message on the first paging occasion, for example, the terminal device a, the terminal device b, and the terminal device c.

In another manner of determining the first period, the network device sends third indication information to the terminal device a, where the third indication information is used to indicate a first period corresponding to a terminal device in a group. The terminal device a determines, based on the identity of the terminal device a and the quantity of groups, a group to which the terminal device a belongs: where an index of the group is equal to (UE_ID) mod X, and then determines the first period of the terminal device a based on the third indication information. The network device sends the third indication information to the terminal device a by using a broadcast message or RRC signaling, where the broadcast message or the RRC signaling includes the third indication information. In an example, the network device sends the first indication information and the third indication information by using a same broadcast message or a same piece of RRC signaling.

Embodiment 2c

The terminal device a determines the first period based on a value range of the first period. For example, the terminal device a randomly determines a period within the value range of the first period as the first period. The value range of the first period is [0, M], where M is a value greater than 0. A unit of the first period is second, millisecond, microsecond, or nanosecond, or is a slot, a mini-slot, or a subframe. The terminal device a obtains the value range of the first period. For example, the value of M is configured by the network device and sent to the terminal device a. For example, the value of M is sent to the terminal device a by using a broadcast message or RRC signaling. The broadcast message or the RRC signaling includes fourth indication information, where the fourth indication information is used to indicate the value of M. For another example, the value of M is a protocol-agreed value. For another example, a mapping relationship between the service information of the first service and M is pre-specified, so that the terminal device determines the value of M based on the service information of the first service. For another example, the value of M is sent by the network device to the terminal device by using the DCI (where the DCI is used to schedule the paging message) or the paging message, where the DCI or the paging message includes the fourth indication information.

Based on Embodiment 1, the following describes at least one embodiment with reference to Embodiment 2 and Embodiment 3.

Embodiment 2

Figures 1, 6A:
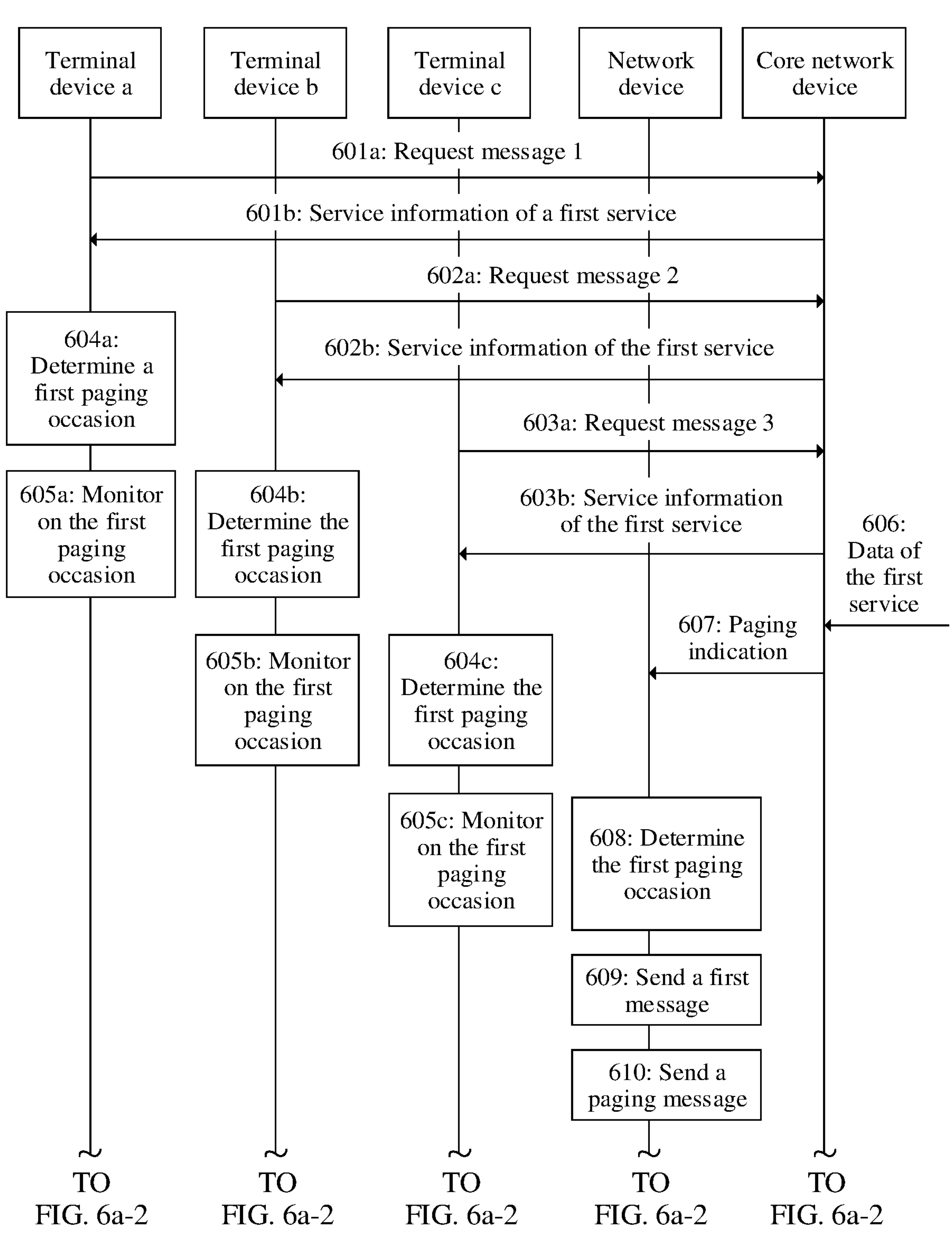
Figures 2, 6A:
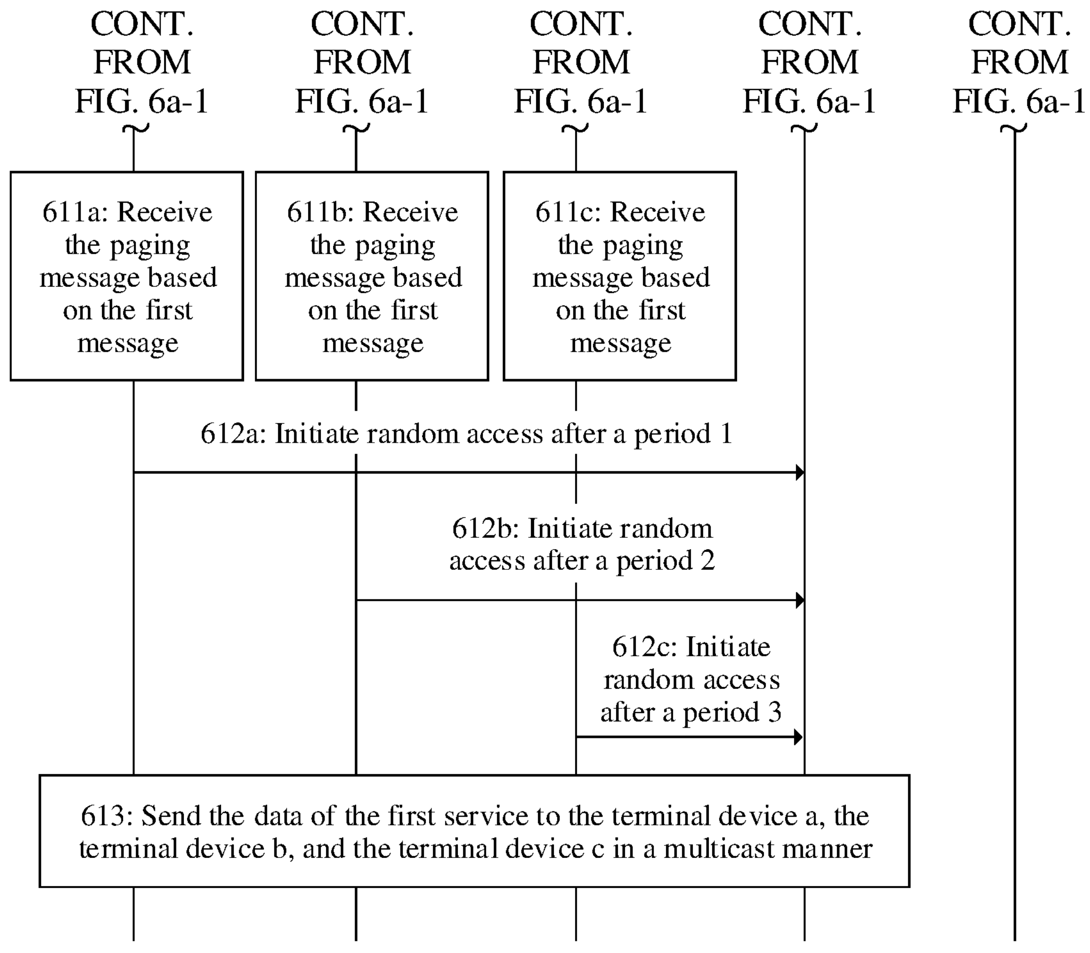
Figure 6B:
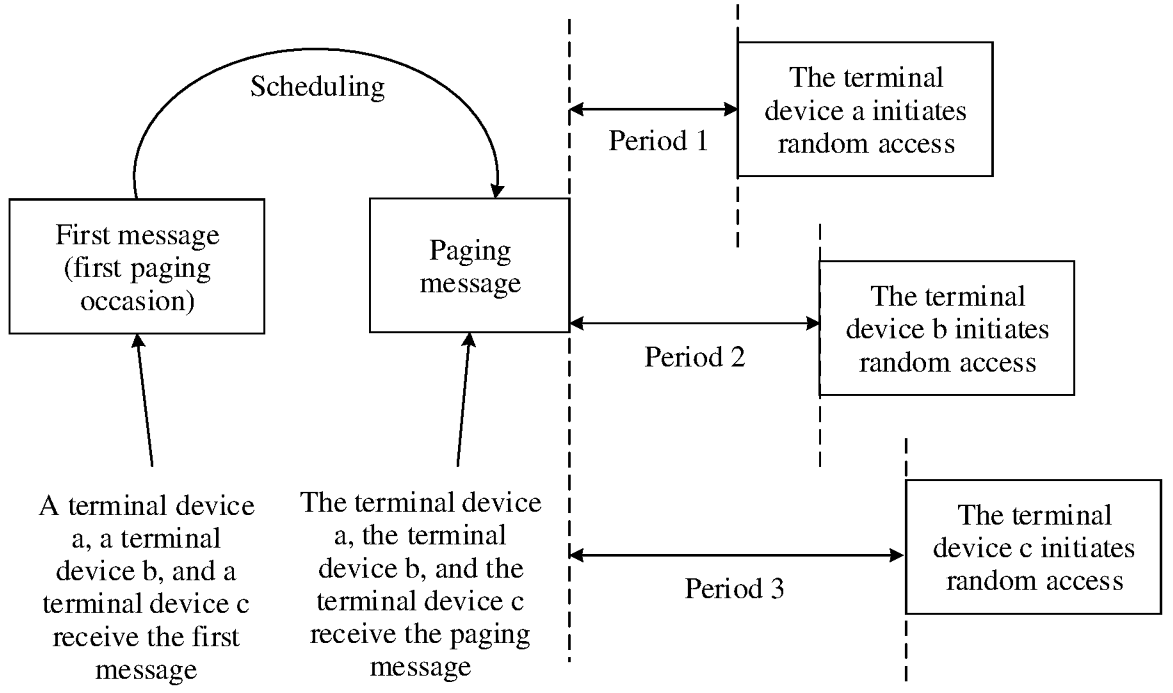
FIG. 6*b* is another schematic flowchart corresponding to a communication method according to at least one embodiment.

FIG. 6*a*-1 and FIG. 6*a*-2 are an example flowchart of a communication method according to Embodiment 2. FIG. 6*b* is another schematic flowchart of a communication method according to Embodiment 2.

As shown in FIG. 6*a*-1 and FIG. 6*a*-2, the procedure includes the following steps.

Step 601*a*: A terminal device a sends a request message 1 to a core network device, where the request message 1 includes a second identity of a service (for example, a first service) that the terminal device a is interested in.

Step 601*b*: The core network device receives the request message 1, and sends service information of the first service to the terminal device a based on the request message 1.

The service information of the first service herein includes a first identity of the first service, and further includes at least one of a DRX (namely, a DRX-4) of the first service and a service type (for example, a first service type and/or a second service type) of the first service. In this embodiment, an example in which the service information of the first service includes the first identity, the DRX-4, and the service type that are of the first service is used for description.

Step 602*a*: A terminal device b sends a request message 2 to the core network device, where the request message 2 includes the second identity of the service (for example, the first service) that the terminal device b is interested in.

Step 602*b*: The core network device receives the request message 2, and sends the service information of the first service to the terminal device b based on the request message 2.

Step 603*a*: A terminal device c sends a request message 3 to the core network device, where the request message 3 includes the second identity of the service (for example, the first service) that the terminal device a is interested in.

Step 603*b*: The core network device receives the request message 3, and sends the service information of the first service to the terminal device c based on the request message 3.

Step 604*a*: The terminal device a receives the service information of the first service, and determines a first paging occasion based on the service information of the first service.

For example, the terminal device a determines a DRX-1 based on the DRX-4, and then determines the first paging occasion based on the first identity and the DRX-1. For specific embodiments, refer to embodiment 1a.

Step 604*b*: The terminal device b receives the service information of the first service, and determines the first paging occasion based on the service information of the first service.

Step 604*c*: The terminal device c receives the service information of the first service, and determines the first paging occasion based on the service information of the first service.

Step 605*a*: The terminal device a monitors a first message on the first paging occasion.

For example, the terminal device a obtains a first RNTI from a broadcast message of a network device, and then monitor the first message on the first paging occasion by using the first RNTI.

Step 605*b*: The terminal device b monitors the first message on the first paging occasion.

Step 605*c*: The terminal device c monitors the first message on the first paging occasion.

Step 606: The core network device receives service data of the first service.

Step 607: The core network device sends a paging indication to the network device, where the paging indication includes the service information of the first service and/or an identity of a terminal device that is to receive the first service.

Step 608: The network device receives the paging indication, and determines the first paging occasion based on the service information of the first service.

Step 609: The network device sends the first message on the first paging occasion, where the first message is used to schedule a paging message, and the first message is scrambled by using the first RNTI.

For example, the first message includes at least one of the first identity, the DRX-4, and the service type that are of the first service.

Step 610: The network device sends the paging message.

Step 611*a*: The terminal device a obtains the first message on the first paging occasion through monitoring, and receives the paging message based on the first message.

For example, the paging message includes at least one of the first identity, the DRX-4, and the service type that are of the first service (in this case, the paging message no longer includes the identity of the terminal device that is to receive the first service). After receiving the paging message, the terminal device a determines that service information included in the paging message is the service information of the first service that the terminal device is interested in, and further initiates random access. Alternatively, the paging message includes the identity of the terminal device that is to receive the first service. After receiving the paging message, the terminal device a determines that the paging message includes an identity of the terminal device a, and further initiates random access.

Step 611*b*: The terminal device b obtains the first message on the first paging occasion through monitoring, and receives the paging message based on the first message.

Step 611*c*: The terminal device c obtains the first message on the first paging occasion through monitoring, and receives the paging message based on the first message.

Step 612*a*: The terminal device a determines a period 1, and initiates random access after the period 1.

For example, the network device indicates in advance, to the terminal device a, that a value range of a period is [0, M], and then the terminal device a determines the first period based on the value range. For example, the period 1 is M1. The terminal device a uses an end moment of a time domain resource carrying the paging message as a start moment of waiting, and initiates random access after the period 1.

Step 612*b*: The terminal device b determines a period 2, and initiates random access after the period 2.

Step 612*c*: The terminal device c determines a period 3, and initiates random access after the period 3.

Step 613: The network device sends the data of the first service to the terminal device a, the terminal device b, and the terminal device c in a multicast manner.

Embodiment 3

Figures 1, 7A:
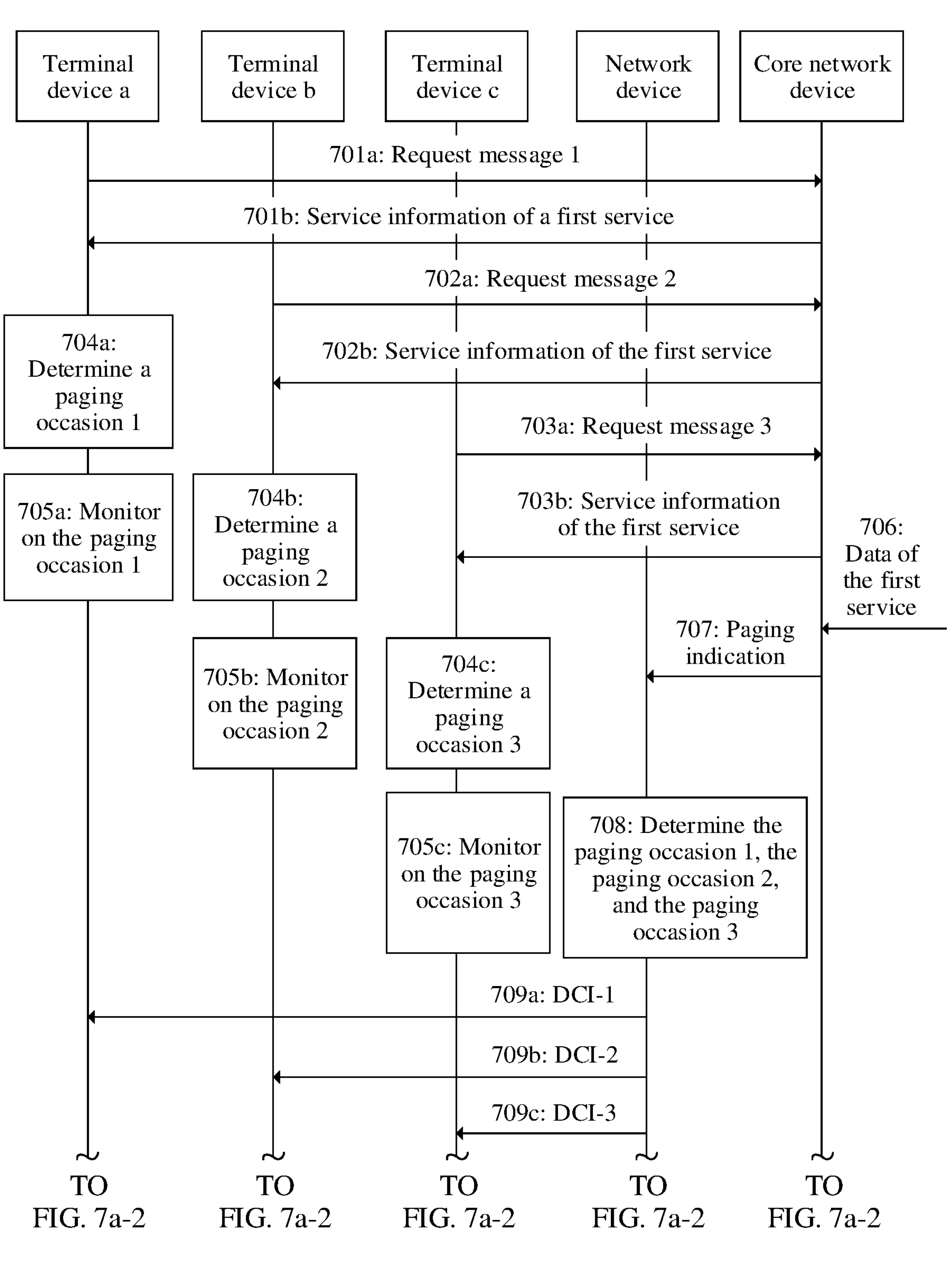
Figures 2, 7A:
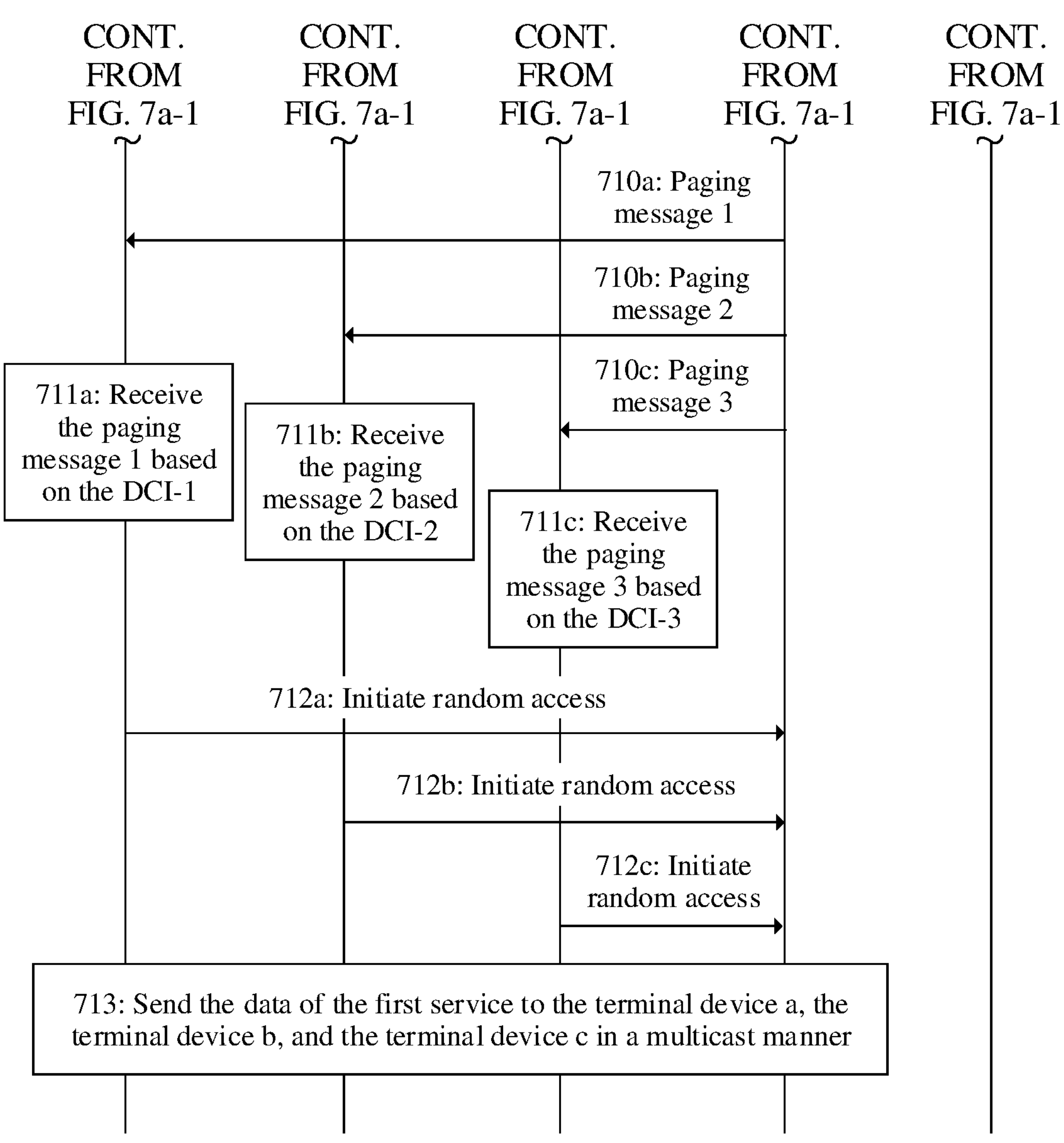
Figure 7B:
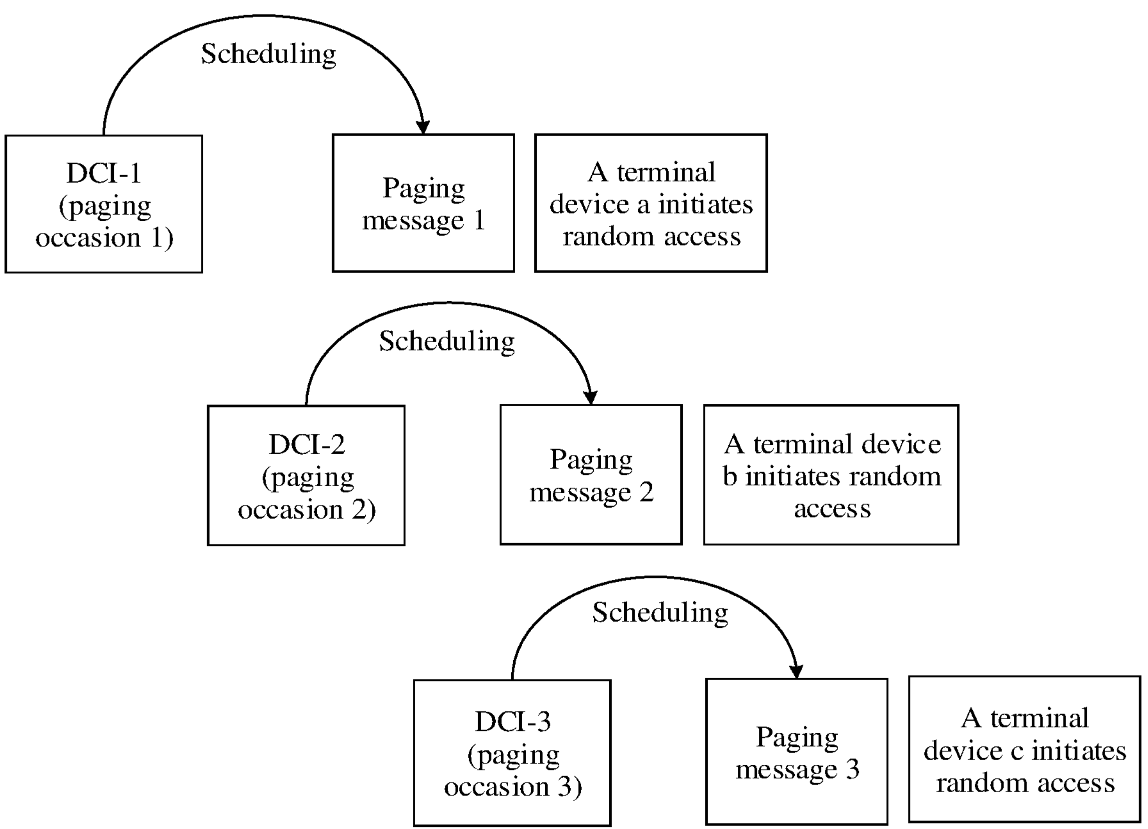
FIG. 7*b* is another schematic flowchart corresponding to a communication method according to at least one embodiment.

FIG. 7*a*-1 and FIG. 7*a*-2 are an example flowchart of a communication method according to Embodiment 3. FIG. 7*b* is another schematic flowchart of a communication method according to Embodiment 3.

As shown in FIG. 7*a*-1 and FIG. 7*a*-2, the procedure includes the following steps.

Step 701*a*: A terminal device a sends a request message 1 to a core network device, where the request message 1 includes a second identity of a service (for example, a first service) that the terminal device a is interested in.

Step 701*b*: The core network device receives the request message 1, and sends service information of the first service to the terminal device a based on the request message 1.

The service information of the first service herein includes at least one of a first identity of the first service, a DRX (namely, a DRX-4) of the first service, and a service type (for example, a first service type and/or a second service type) of the first service. In this embodiment, an example in which the service information of the first service includes the first identity of the first service is used for description.

Step 702*a*: A terminal device b sends a request message 2 to the core network device, where the request message 2 includes the second identity of the service (for example, the first service) that the terminal device a is interested in.

Step 702*b*: The core network device receives the request message 2, and sends the service information of the first service to the terminal device b based on the request message 2.

Step 703*a*: A terminal device c sends a request message 3 to the core network device, where the request message 3 includes the second identity of the service (for example, the first service) that the terminal device a is interested in.

Step 703*b*: The core network device receives the request message 3, and sends the service information of the first service to the terminal device c based on the request message 3.

Step 704*a*: The terminal device a receives the service information of the first service, and determines a paging occasion 1 based on an identity of the terminal device a.

For example, the terminal device a determines the paging occasion 1 in embodiment 2a.

Step 704*b*: The terminal device b receives the service information of the first service, and determines a paging occasion 2 based on an identity of the terminal device b.

Step 704*c*: The terminal device c receives the service information of the first service, and determines a paging occasion 3 based on an identity of the terminal device c.

Step 705*a*: The terminal device a monitors DCI-1 on the paging occasion 1.

For example, the terminal device a monitors the DCI-1 on the paging occasion 1 by using a P-RNTI.

Step 705*b*: The terminal device b monitors DCI-2 on the paging occasion 2.

For example, the terminal device b monitors the DCI-2 on the paging occasion 1 by using a P-RNTI.

Step 705*c*: The terminal device c monitors DCI-3 on the paging occasion 3.

For example, the terminal device c monitors the DCI-3 on the paging occasion 1 by using a P-RNTI.

Step 706: The core network device receives service data of the first service.

Step 707: The core network device sends a paging indication to the network device, where the paging indication includes the service information of the first service and an identity of a terminal device that is to receive the first service.

Step 708: The network device receives the paging indication, and determines the paging occasion 1, the paging occasion 2, and the paging occasion 3 respectively based on the identity of the terminal device a, the identity of the terminal device b, and the identity of the terminal device c.

Step 709*a*: The network device sends the DCI-1 on the paging occasion 1, where the DCI-1 is scrambled by using the P-RNTI.

Step 709*b*: The network device sends the DCI-2 on the paging occasion 2, where the DCI-2 is scrambled by using the P-RNTI.

Step 709*c*: The network device sends the DCI-3 on the paging occasion 3, where the DCI-3 is scrambled by using the P-RNTI.

For example, the DCI-1, the DCI-2, or the DCI-3 includes the service information of the first service, for example, the first identity of the first service.

Step 710*a*: The network device sends a paging message 1.

Step 710*b*: The network device sends a paging message 2.

Step 710*c*: The network device sends a paging message 3.

Step 711*a*: The terminal device a obtains the DCI-1 on the paging occasion 1 through monitoring, and receives the paging message 1 based on the DCI-1.

Step 711*b*: The terminal device b obtains the DCI-2 on the paging occasion 2 through monitoring, and receives the paging message 2 based on the DCI-2.

Step 711*c*: The terminal device c obtains the DCI-3 on the paging occasion 3 through monitoring, and receives the paging message 3 based on the DCI-3.

For example, the paging message 1, the paging message 2, or the paging message 3 includes the service information of the first service, for example, the first identity of the first service. The paging message 1 is used as an example. In response to the paging message 1 including the first identity of the first service, the paging message 1 no longer includes the identity of the terminal device that is to receive the first service.

Step 712*a*: The terminal device a initiates random access.

Step 712*b*: The terminal device b initiates random access.

Step 712*c*: The terminal device c initiates random access.

In this embodiment, after separately receiving the paging message, the terminal device a, the terminal device b, or the terminal device c initiates random access, and does not wait for a specific period before initiating random access.

Step 713: The network device sends the data of the first service to the terminal device a, the terminal device b, and the terminal device c in a multicast manner.

For the foregoing Embodiment 1, Embodiment 2, and Embodiment 3, Step numbers in FIG. 5, FIG. 6*a*-1 and FIG. 6*a*-2, and FIG. 7*a*-1 and FIG. 7*a*-2 are merely examples of execution procedures, and do not constitute any limitation on an execution sequence of the steps. In at least one embodiment, there is no strict execution sequence between steps that have no time sequence dependency relationship. The foregoing Embodiment 1 describes steps shown in FIG. 5. In at least one embodiment, different steps are combined. For example, in at least one embodiment, embodiment 1a, embodiment 2b, and embodiment 1c is performed. For another example, in at least one embodiment, embodiment 1 a, embodiment 2b, and embodiment 2c are performed. In the foregoing Embodiment 2 and Embodiment 3, for the terminal device b and the terminal device c, refer to the terminal device a. The steps in FIG. 6*a*-1 and FIG. 6*a*-2, and FIG. 7*a*-1 and FIG. 7*a*-2, are described with reference to Embodiment 1.

The foregoing describes the solutions provided in at least one embodiment from a perspective of interaction between a network device and a terminal device. To implement the foregoing functions, the network device or the terminal device includes a corresponding hardware structure and/or a software module for performing a function. A person skilled in the art is aware that, in combination with units and algorithm steps of the examples described in embodiments disclosed herein, at least one embodiment is implemented by hardware or a combination of hardware and computer software. Whether a function is performed by hardware or hardware driven by computer software depends on particular embodiment and design constraints of the technical solutions. A person skilled in the art uses different methods to implement the described functions for at least one embodiment.

Figure 8:
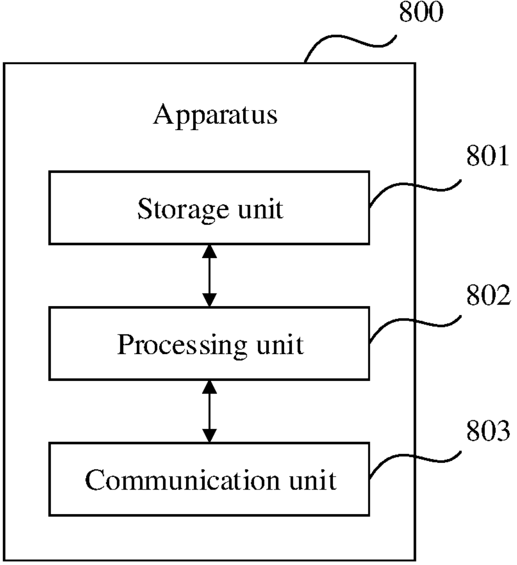
FIG. 8 is a possible example block diagram of an apparatus according to at least one embodiment.

In at least one embodiment, division into function units is performed on the terminal device and the network device based on the foregoing method examples. For example, division into a function unit is based on a corresponding function, or two or more functions is integrated into one unit. The integrated unit is implemented in a form of hardware, or is implemented in a form of a software function unit.

in response to an integrated unit being used, FIG. 8 is a example block diagram of an apparatus according to at least one embodiment. As shown in FIG. 8, the apparatus 800 includes a processing unit 802 and a communication unit 803. The processing unit 802 is configured to control and manage an action of the apparatus 800. The communication unit 803 is configured to support communication between the apparatus 800 and another device. Optionally, the communication unit 803 is also referred to as a transceiver unit, and includes a receiving unit and/or a sending unit, which are respectively configured to perform a receiving operation and a sending operation. The apparatus 800 further includes a storage unit 801, configured to store program code and/or data of the apparatus 800.

In an embodiment, the apparatus 800 is the terminal device (or a chip disposed in the terminal device) in any one of the foregoing embodiments. The processing unit 802 supports the apparatus 800 to perform actions of the terminal device in the foregoing method examples. Alternatively, the processing unit 802 mainly performs internal actions of the terminal device in the method examples. The communication unit 803 supports the communication between the apparatus 800 and the another device (for example, a network device or a core network device).

The communication unit 803 is configured to obtain a first identity, where the first identity includes at least one of a service identity and a group identity. The processing unit 802 is configured to determine a first paging occasion based on the first identity, where the first paging occasion is used by a first terminal device to receive a first message, and the first message is used to page the first terminal device.

In at least one embodiment, the communication unit 803 is further configured to obtain a discontinuous reception cycle DRX; and the processing unit is configured to determine the first paging occasion based on the first identity and the DRX.

In at least one embodiment, the processing unit 802 is configured to: determine a first paging frame based on the first identity, and determine the first paging occasion in the first paging frame based on the first identity.

In at least one embodiment, the communication unit 803 is configured to: send a request message to the core network device, where the request message is used to request the first identity, and receive a response message from the core network device, where the response message includes the first identity.

In at least one embodiment, the processing unit 802 is further configured to determine a first period; and the communication unit is further configured to: in response to the first message being received, initiate random access after the first period.

In at least one embodiment, first periods determined by terminal devices that belong to different groups in a plurality of terminal devices are different, where the plurality of terminal devices are terminal devices that receive the first message on the first paging occasion.

In another embodiment, the apparatus 800 is the network device (or a chip disposed in the network device) in any one of the foregoing embodiments. The processing unit 802 supports the apparatus 800 to perform actions of the network device in the foregoing method examples. Alternatively, the processing unit 802 mainly performs internal actions of the network device in the method examples. The communication unit 803 supports the communication between the apparatus 800 and the another device (for example, a terminal device or a core network device).

The communication unit 803 is configured to obtain a first identity, where the first identity includes at least one of a service identity and a group identity. The processing unit 802 is configured to determine a first paging occasion based on the first identity, where the first paging occasion is used by a first terminal device to receive a first message, and the first message is used to page the first terminal device.

In at least one embodiment, the communication unit 803 is further configured to obtain a discontinuous reception cycle DRX; and the processing unit is configured to determine the first paging occasion based on the first identity and the DRX.

In at least one embodiment, the processing unit 802 is configured to: determine a first paging frame based on the first identity, and determine the first paging occasion in the first paging frame based on the first identity.

In at least one embodiment, the communication unit 803 is configured to receive third indication information from the core network device, where the third indication information includes the first identity, and the third indication information is used to indicate to page at least one terminal device.

In another embodiment, the apparatus 800 is the core network device (or a chip disposed in the core network device) in any one of the foregoing embodiments. The processing unit 802 supports the apparatus 800 to perform actions of the core network device in the foregoing method examples. Alternatively, the processing unit 802 mainly performs internal actions of the core network device in the method examples. The communication unit 803 supports the communication between the apparatus 800 and the another device (for example, a terminal device or a network device).

The communication unit 803 includes a receiving unit and a sending unit. The receiving unit is configured to receive service data of a first service. The sending unit is configured to send third indication information to the network device, where the third indication information includes a first identity of the first service, the first identity includes at least one of a service identity and a group identity, and the third indication information is used to indicate to page at least one terminal device. In at least one embodiment, the third indication information further includes at least one of a DRX and a service type that are of the first service.

Division of the foregoing apparatus into the units is logical function division. In at least one embodiment, all or some of the units are integrated into a physical entity, or is physically separate. In addition, the units in the apparatus are implemented in a form in which a processing element invokes software, or is implemented in a form of hardware; or some units is implemented in a form in which a processing element invokes software, and some units are implemented in a form of hardware. For example, units is separately disposed processing elements, or is integrated into a chip of the apparatus. In addition, the units is stored in a memory in a program form, and is invoked by a processing element of the apparatus to perform functions of the units. In addition, all or some of the units are integrated, or are implemented independently. The processing element herein is also referred to as a processor, and is an integrated circuit having a signal processing capability. In at least one embodiment, steps in the foregoing methods or the foregoing units is implemented by using a hardware integrated logic circuit in the processing element, or is implemented in a form in which the processing element invokes software.

For example, a unit in any one of the foregoing apparatuses is one or more integrated circuits configured to implement the foregoing methods, for example, one or more application-specific integrated circuits (Application-Specific Integrated Circuits, ASICs), one or more microprocessors (digital signal processors, DSPs), one or more field programmable gate arrays (Field Programmable Gate Arrays, FPGAs), or a combination of at least two of the integrated circuits. For another example, in response to the unit in the apparatus being implemented by scheduling a program by a processing element, the processing element is a processor, for example, a central processing unit (central processing unit, CPU) or another processor that can invoke the program. For another example, the units is integrated together and implemented in a form of a system-on-a-chip (system-on-a-chip, SOC).

The foregoing receiving unit is an interface circuit of the apparatus, and is configured to receive a signal from another apparatus. For example, in response to the apparatus being implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, in response to the apparatus being implemented by a chip, the sending unit is an interface circuit that is of the chip and that is configured to send a signal to another chip or apparatus.

Figure 9:
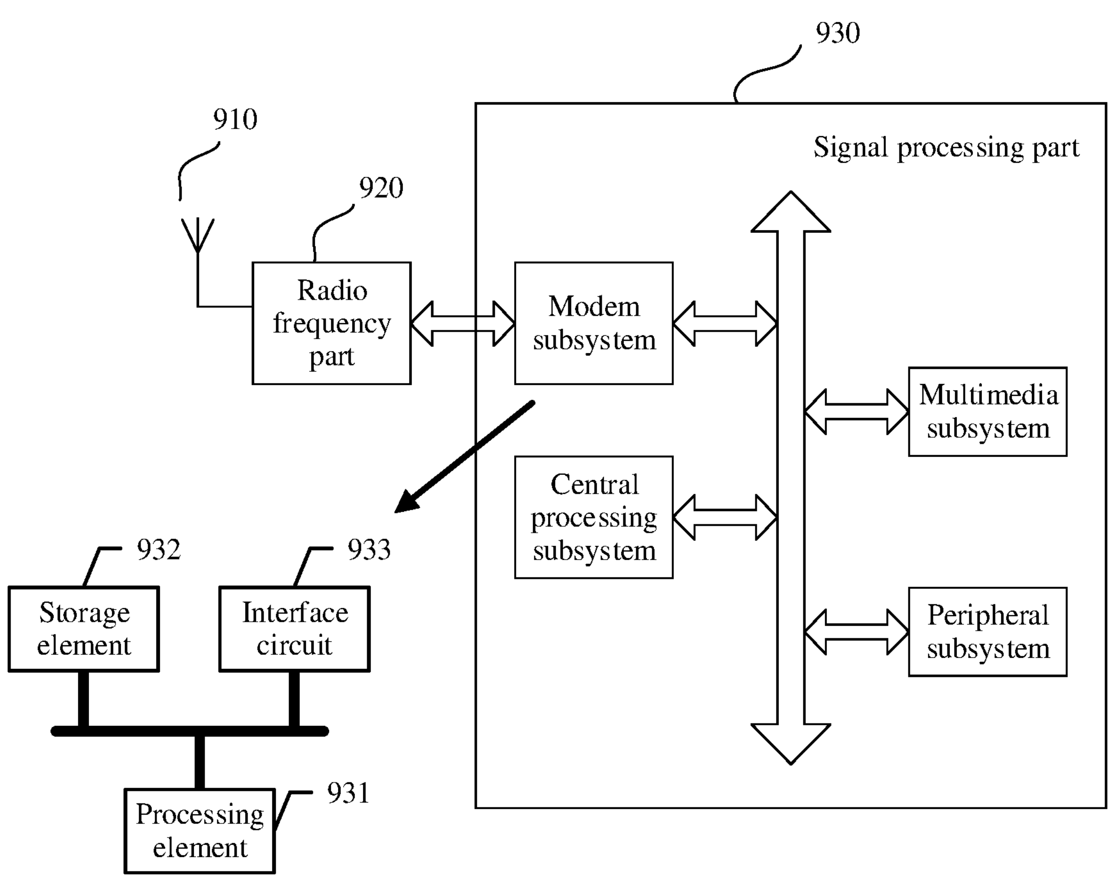
FIG. 9 is a schematic diagram of a structure of a terminal device according to at least one embodiment.

FIG. 9 is a schematic diagram of a structure of a terminal device according to at least one embodiment. The terminal device is the terminal device (for example, the terminal device a in Embodiment 1, or the terminal device a, the terminal device b, or the terminal device c in Embodiment 2 or Embodiment 3) in the foregoing embodiments, and is configured to implement operations of the terminal device in the foregoing embodiments. As shown in FIG. 9, the terminal device includes an antenna 910, a radio frequency part 920, and a signal processing part 930. The antenna 910 is connected to the radio frequency part 920. In a downlink direction, the radio frequency part 920 receives, through the antenna 910, information sent by a network device, and sends, to the signal processing part 930 for processing, the information sent by the network device. In an uplink direction, the signal processing part 930 processes information of the terminal device, and sends the information to the radio frequency part 920. The radio frequency part 920 processes the information of the terminal device, and then sends the processed information to the network device through the antenna 910.

The signal processing part 930 includes a modem subsystem, configured to process data at a communication protocol layer. The signal processing part 930 further includes a central processing subsystem, configured to process an operating system and an application layer of the terminal device. In addition, the signal processing part 930 further includes another subsystem, for example, a multimedia subsystem or a peripheral subsystem. The multimedia subsystem is configured to control a camera, a screen display, and the like of the terminal device. The peripheral subsystem is configured to connect to another device. The modem subsystem is a chip that is separately disposed.

The modem subsystem includes one or more processing elements 931, for example, include one main control CPU and another integrated circuit. In addition, the modem subsystem further includes a storage element 932 and an interface circuit 933. The storage element 932 is configured to store data and a program. However, a program used to perform the methods performed by the terminal device in the foregoing methods may not be stored in the storage element 932, but is stored in a memory outside the modem subsystem, and is loaded by the modem subsystem for use. The interface circuit 933 is configured to communicate with another subsystem.

The modem subsystem is implemented by a chip. The chip includes at least one processing element and an interface circuit. The processing element is configured to perform the steps of any method performed by the foregoing terminal device. The interface circuit is configured to communicate with another apparatus. In at least one embodiment, units in the terminal device for implementing the steps in the foregoing methods is implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element is a storage element located on a same chip as the processing element, namely, an on-chip storage element.

In at least one embodiment, a program used to perform the method performed by the terminal device in the foregoing methods is in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In at least one embodiment, units in the terminal device for implementing the steps in the foregoing methods is configured as one or more processing elements. These processing elements are disposed in the modem subsystem. The processing element herein is an integrated circuit, for example, one or more ASICs, one or more DSPs, one or more FPGAs, or a combination of these types of integrated circuits. The integrated circuits is integrated together to form a chip.

Units of the terminal device that implement the steps in the foregoing methods is integrated together, and implemented in a form of an SOC. The SOC chip is configured to implement the foregoing methods. At least one processing element and storage element is integrated into the chip, and the processing element invokes a program stored in the storage element to implement the foregoing methods performed by the terminal device. Alternatively, at least one integrated circuit is integrated into the chip, to implement the foregoing methods performed by the terminal device. Alternatively, with reference to the foregoing embodiments, functions of some units is implemented by invoking a program by the processing element, and functions of some units is implemented by the integrated circuit.

The foregoing apparatus that is used in the terminal device includes at least one processing element and an interface circuit. The at least one processing element is configured to perform any one of the methods that are provided in the foregoing method embodiments and performed by the terminal device. The processing element performs some or all steps performed by the terminal device, in a first manner, to be specific, by invoking the program stored in the storage element; or performs some or all steps performed by the terminal device, in a second manner, to be specific, by using a hardware integrated logic circuit in the processing element in combination with instructions; or performs, by combining the first manner and the second manner, some or all steps performed by the terminal device.

The processing element herein is the same as that described above, and is implemented by using a processor. A function of the processing element is the same as a function of the processing unit described in FIG. 8. For example, the processing element is a general-purpose processor, for example, a CPU, or is one or more integrated circuits, for example, one or more ASICs, one or more microprocessors DSPs, one or more FPGAs, or a combination of at least two of these types of integrated circuits, configured to implement the foregoing methods. The storage element is implemented by using a memory. A function of the storage element is the same as a function of the storage unit described in FIG. 8. The storage element is one memory, or an umbrella term of a plurality of memories.

The terminal device shown in FIG. 9 implements the processes related to the terminal device in the method embodiments shown in FIG. 5, FIG. 6*a*-1 and FIG. 6*a*-2, or FIG. 7*a*-1 and FIG. 7*a*-2. Operations and/or functions of the modules in the terminal device shown in FIG. 9 are intended to implement the corresponding procedures in the foregoing method embodiments. For details, refer to the descriptions in the foregoing method embodiments. To avoid repetition, detailed descriptions are properly omitted herein.

Figure 10:
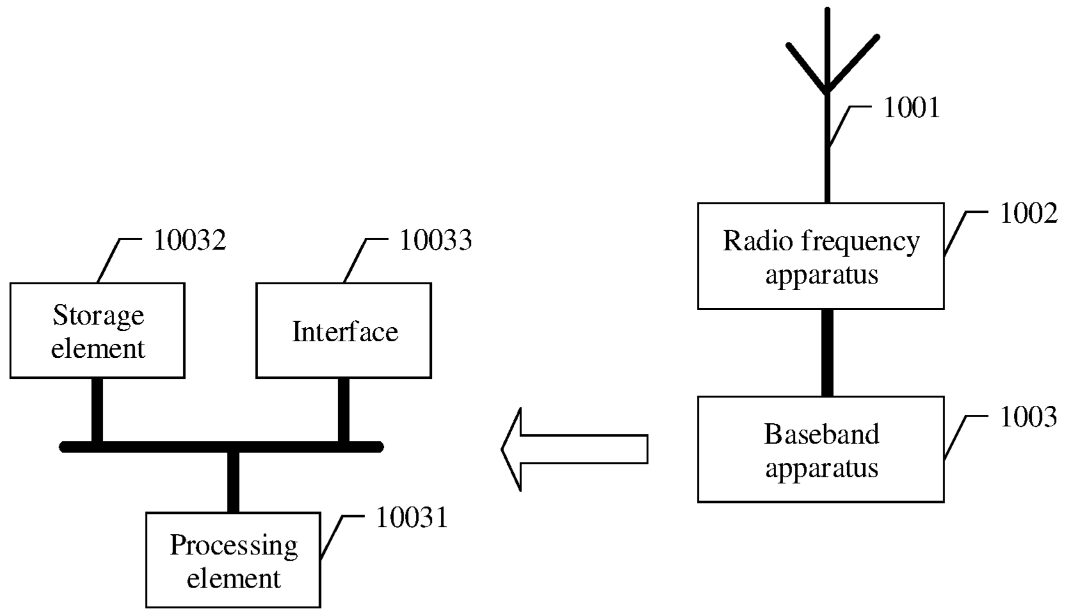
FIG. 10 is a schematic diagram of a structure of a network device according to at least one embodiment.

FIG. 10 is a schematic diagram of a structure of a network device according to at least one embodiment. The network device is configured to implement the operations of the network device in the foregoing embodiments. As shown in FIG. 10, the network device includes an antenna 1001, a radio frequency apparatus 1002, and a baseband apparatus 1003. The antenna 1001 is connected to the radio frequency apparatus 1002. In an uplink direction, the radio frequency apparatus 1002 receives, through the antenna 1001, information sent by a terminal device, and sends, to the baseband apparatus 1003 for processing, the information sent by the terminal device. In a downlink direction, the baseband apparatus 1003 processes information that is to be sent to the terminal device, and sends the information to the radio frequency apparatus 1002. The radio frequency apparatus 1002 processes the information of the terminal device, and then sends the processed information to the terminal device through the antenna 1001.

The baseband apparatus 1003 includes one or more processing elements 10031, for example, include one main control CPU and another integrated circuit. In addition, the baseband apparatus 1003 further includes a storage element 10032 and an interface 10033. The storage element 10032 is configured to store a program and data. The interface 10033 is configured to exchange information with the radio frequency apparatus 1002, and the interface is, for example, a common public radio interface (common public radio interface, CPRI). The foregoing apparatus used in the network device is located in the baseband apparatus 1003. For example, the foregoing apparatus used in the network device is a chip in the baseband apparatus 1003. The chip includes at least one processing element and an interface circuit. The processing element is configured to perform steps in any method performed by the network device. The interface circuit is configured to communicate with another apparatus. In at least one embodiment, units in the network device for implementing the steps in the foregoing methods is implemented in a form of scheduling a program by the processing element. For example, the apparatus used in the network device includes a processing element and a storage element. The processing element invokes a program stored in the storage element, to perform the method performed by the network device in the foregoing method embodiments. The storage element is a storage element that is located on a same chip as the processing element, namely, an on-chip storage element, or is a storage element that is located on a different chip from the processing element, namely, an off-chip storage element.

In at least one embodiment, units in the network device for implementing the steps in the foregoing methods is configured as one or more processing elements. These processing elements are disposed on the baseband apparatus. The processing element herein is an integrated circuit, for example, one or more ASICs, one or more DSPs, one or more FPGAs, or a combination of these types of integrated circuits. The integrated circuits is integrated together to form a chip.

The units of the network device for implementing the steps in the foregoing methods is integrated together, and implemented in a form of a system-on-a-chip (system-on-a-chip, SOC). For example, the baseband apparatus includes the SOC chip, and is configured to implement the foregoing methods. At least one processing element and storage element is integrated into the chip, and the processing element invokes a program stored in the storage element to implement the foregoing method performed by the network device. Alternatively, at least one integrated circuit is integrated into the chip, to implement the foregoing methods performed by the network device. Alternatively, with reference to the foregoing embodiments, functions of some units is implemented by invoking a program by the processing element, and functions of some units is implemented by the integrated circuit.

The foregoing apparatus that is used in the network device includes at least one processing element and an interface circuit. The at least one processing element is configured to perform any one of the methods that are provided in the foregoing method embodiments and performed by the network device. The processing element performs some or all steps performed by the network device in a first manner, to be specific, by invoking the program stored in the storage element; or performs some or all steps performed by the network device in a second manner, to be specific, by using a hardware integrated logic circuit in the processing element in combination with instructions; or performs, by combining the first manner and the second manner, some or all steps performed by the network device.

The processing element herein is the same as that described above, and is implemented by using a processor. A function of the processing element is the same as a function of the processing unit described in FIG. 8. For example, the processing element is a general-purpose processor, for example, a CPU, or is one or more integrated circuits, for example, one or more ASICs, one or more microprocessors DSPs, one or more FPGAs, or a combination of at least two of these types of integrated circuits, configured to implement the foregoing methods. The storage element is implemented by using a memory. A function of the storage element is the same as a function of the storage unit described in FIG. 8. The storage element is one memory, or an umbrella term of a plurality of memories.

The network device shown in FIG. 10 implements the processes related to the network device in the method embodiments shown in FIG. 5, FIG. 6*a*-1 and FIG. 6*a*-2, or FIG. 7*a*-1 and FIG. 7*a*-2. Operations and/or functions of the modules in the network device shown in FIG. 10 are intended to implement the corresponding procedures in the foregoing method embodiments. For details, refer to the descriptions in the foregoing method embodiments. To avoid repetition, detailed descriptions are properly omitted herein.

A person skilled in the art understands that at least one embodiment is provided as a method, a system, or a computer program product. Therefore, at least one embodiment uses a form of a hardware-only embodiment, a software-only embodiment, or an embodiment with a combination of software and hardware. Moreover, at least one embodiment uses a form of a computer program product that is implemented on one or more computer-usable storage media (including but not limited to a magnetic disk memory, a CD-ROM, an optical memory, and the like) that include computer-usable program code.

At least one embodiment is described with reference to the flowcharts and/or block diagrams of the method, the device (system), and the computer program product according to at least one embodiment. Computer program instructions is used to implement a process and/or a block in the flowcharts and/or the block diagrams and a combination of a process and/or a block in the flowcharts and/or the block diagrams. These computer program instructions is provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions are alternatively stored in a computer-readable memory that initiates a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions are alternatively loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Various modifications and variations are capable of being made without departing from the spirit and scope of this application. At least one embodiment is intended to cover these modifications and variations provided that they fall within the scope of protection defined by the following claims and their equivalent technologies.

What is claimed is:

1. A communication method, wherein the method comprises:

obtaining a first identity, wherein the first identity comprises at least one of a service identity and a group identity;

determining a first paging occasion based on the first identity, wherein the first paging occasion is used by a first terminal device to receive a first message, and the first message is used to page the first terminal device;

determining, by the first terminal device, a first period; and in response to the first message being received, initiating random access after the first period, and the first period is determined based on an identity of the first terminal device and a quantity of groups;

wherein each terminal device of a plurality of terminal devices is part of a corresponding different group, each terminal device of the plurality of terminal devices determines a corresponding different first period of a plurality of first periods;

the first period is in the plurality of first periods;

the first terminal device is in the plurality of terminals; and the plurality of terminal devices receive the first message on the first paging occasion.

2. The method according to claim 1, wherein the method further comprises:

obtaining a discontinuous reception cycle (DRX); and determining the first paging occasion based on the first identity and the DRX.

3. The method according to claim 1, wherein the determining the first paging occasion based on the first identity includes:

determining a first paging frame based on the first identity; and determining the first paging occasion in the first paging frame based on the first identity.

4. The method according to claim 3, wherein the method further comprises obtaining a discontinuous reception cycle (DRX), and wherein the first paging frame satisfies the following formula:

$$(\mathrm{SFN}+\mathrm{PF\_offset}) \bmod T=(T \operatorname{div} N)*(S\_\mathrm{ID} \bmod N),$$

wherein

SFN is a frame number of the first paging frame, PF_offset is an offset corresponding to the first paging frame, T is the DRX, N is a quantity of paging frames in the DRX, and S_ID is the first identity; and the first paging occasion satisfies the following formula:

$$i\_s=\mathrm{floor}(S\_\mathrm{ID}/N) \bmod Ns,$$ wherein i_s is an index value of the first paging occasion, and Ns is a quantity of paging occasions in the first paging frame.

5. The method according to claim 1, wherein the first message is scrambled by using a first radio network temporary identity RNTI, wherein the first RNTI and a second RNTI are different RNTIs; and a second message is scrambled by using the second RNTI, wherein the second message is used to page a second terminal device.

6. The method according to claim 1, wherein the receiving the first message includes receiving at least one of the first identity and a service type; or the receiving the first message includes receiving an indication that the first terminal device is to receive a third message, wherein the third message includes at least one of the first identity and the service type that are of a first service.

7. The method according to claim 1, wherein the obtaining the first identity includes:

sending a request message to a core network device, wherein the request message is used to request the first identity; and receiving a response message from the core network device, wherein the response message comprises the first identity.

8. The method according to claim 1, wherein the first period determined by the first terminal device based on the identity of the first terminal device and the quantity of groups is equal to a following formula:

$$((UE\_ID) \bmod X)*t,$$

where UE_ID is the identity of the first terminal device, X is the quantity of groups, and t is a second period.

9. A communication apparatus, wherein the apparatus comprising one or more processors; and a memory, wherein the memory stores a computer program, and in response to executing the computer program stored in the memory, the one or more processors executes operations comprising:

obtaining, a first identity, wherein the first identity includes at least one of a service identity and a group identity;

determining, a first paging occasion based on the first identity, wherein the first paging occasion is used by a first terminal device to receive a first message, and the first message is used to page the first terminal device;

determining, by the communication apparatus, a first period; and in response to the first message being received, initiating random access after the first period, and the first period is determined based on an identity of the first terminal device and a quantity of groups;

wherein each terminal device of a plurality of terminal devices is part of a corresponding different group, each terminal device of the plurality of terminal devices determines a corresponding different first period of a plurality of first periods;

the first period is in the plurality of first periods;

the first terminal device is in the plurality of terminals; and the plurality of terminal devices receive the first message on the first paging occasion.

10. The apparatus according to claim 9, wherein the one or more processors executes operations further comprising:

obtaining, a discontinuous reception cycle DRX; and the determining, the first paging occasion based on the first identity, comprising:

determining the first paging occasion based on the first identity and the DRX.

11. The apparatus according to claim 9, wherein the determining, the first paging occasion based on the first identity, includes:

determining, a first paging frame based on the first identity; and determining, the first paging occasion in the first paging frame based on the first identity.

12. The apparatus according to claim 11, wherein the one or more processors executes operations further comprising obtaining, a discontinuous reception cycle DRX, and wherein the first paging frame satisfies a formula according to:

$$(SFN+PF\_offset) \bmod T=(T \text{ div } N)*(S\_ID \bmod N),$$

wherein

SFN is a frame number of the first paging frame, PF_offset is an offset corresponding to the first paging frame, T is the DRX, N is a quantity of paging frames in the DRX, and S_ID is the first identity; and the first paging occasion satisfies the following formula:

$$i\_s=\text{floor}(S\_ID/N) \bmod Ns,$$

wherein i_s is an index value of the first paging occasion, and Ns is a quantity of paging occasions in the first paging frame.

13. The apparatus according to claim 9, wherein the one or more processors executes operations further comprising:

scrambling the first message by using a first radio network temporary identity RNTI, wherein the first RNTI and a second RNTI are different RNTIs; and scrambling a second message is scrambled by using the second RNTI, wherein the second message is used to page a second terminal device.

14. The apparatus according to claim 9, wherein the first message includes at least one of the first identity and a service type; or the first message indicates that the first terminal device is to receive a third message, wherein the third message includes at least one of the first identity and the service type that are of a first service.

15. The apparatus according to claim 9, wherein the one or more processors executes operations further comprising:

sending a request message to a core network device, wherein the request message is used to request the first identity; and receiving a response message from the core network device, wherein the response message includes the first identity.

16. The apparatus according to claim 9, wherein the first period determined by the first terminal device based on the identity of the first terminal device and the quantity of groups is equal to a following formula:

$$((UE\_ID) \bmod X)*t,$$

where UE_ID is the identity of the first terminal device, X is the quantity of groups, and t is a second period.

* * * * *